(12) United States Patent
Matsumoto

(10) Patent No.: US 8,852,057 B2
(45) Date of Patent: Oct. 7, 2014

(54) STRUCTURE FOR CONNECTION AND SEPARATION BETWEEN AN ENGINE AND A MAIN UNIT

(75) Inventor: Toshio Matsumoto, Okayama (JP)

(73) Assignee: Kaaz Corporation, Okayama-Ken (JP)

( * ) Notice: Subject to any disclaimer, the term of this patent is extended or adjusted under 35 U.S.C. 154(b) by 545 days.

(21) Appl. No.: 13/259,093

(22) PCT Filed: Mar. 24, 2010

(86) PCT No.: PCT/JP2010/055130
§ 371 (c)(1),
(2), (4) Date: Sep. 22, 2011

(87) PCT Pub. No.: WO2010/110345
PCT Pub. Date: Sep. 30, 2010

(65) Prior Publication Data
US 2012/0018273 A1  Jan. 26, 2012

(30) Foreign Application Priority Data
Mar. 25, 2009  (JP) ................. 2009-074856

(51) Int. Cl.
F02B 63/00  (2006.01)
A01D 69/08  (2006.01)
A01D 34/90  (2006.01)

(52) U.S. Cl.
CPC ............... A01D 69/08 (2013.01); A01D 34/90 (2013.01); *Y10S 192/01* (2013.01); *Y10S 56/06* (2013.01)
USPC .................. 477/181; 192/103 B; 192/DIG. 1; 56/DIG. 6

(58) Field of Classification Search
None
See application file for complete search history.

(56) References Cited

U.S. PATENT DOCUMENTS

| | | | |
|---|---|---|---|
| 3,724,237 A * | 4/1973 | Wood | 464/177 |
| 3,885,547 A * | 5/1975 | Doepke et al. | 123/198 D |
| 4,341,017 A * | 7/1982 | Janczak | 30/381 |
| 4,350,123 A * | 9/1982 | Kossek et al. | 123/2 |
| 4,757,786 A * | 7/1988 | Ellegard | 123/2 |
| 2005/0193708 A1 * | 9/2005 | Treger et al. | 56/295 |

FOREIGN PATENT DOCUMENTS

| | | | |
|---|---|---|---|
| JP | UM S55-45018 A | 3/1980 | |
| JP | UM S56-66648 A | 6/1981 | |

(Continued)

*Primary Examiner* — Gene Crawford
*Assistant Examiner* — Mark Manley
(74) *Attorney, Agent, or Firm* — DLA Piper LLP (US)

(57) ABSTRACT

Problems to be solved: Providing a structure for connection and separation between an engine and a main unit, adapted to release coupling by separating a centrifugal clutch.

Means for solving the problems: A structure for connection and separation includes an engine side adapter (1) with a clutch shoe (11), an engine side annular surface (121), and an engine side projection (13); and a main unit side adapter (2) with a clutch drum (21), a main unit side annular surface (221), and a main unit side projection (23), wherein the engine side projection (13) projects in a radial direction from a circle centered on the power transmission shaft as a center, and the main unit side projection (23) projects in a direction radially opposite to the direction in which the engine side projection (13) projects; and when the engine side adapter (1) or the main unit side adapter (2) is relatively rotated about the axis of the power transmission shaft with the engine side annular surface (121) and the main unit side annular surface (221) brought into contact with each other, the engine side projection (13) and the main unit side projection (23) are moved to a back side of each other from the circumferential direction to be engaged in the axial direction of the power transmission shaft.

4 Claims, 22 Drawing Sheets

(56) References Cited

FOREIGN PATENT DOCUMENTS

| | | | |
|---|---|---|---|
| JP | UM H3-74218 A | 7/1991 |
| JP | H11-187738 A | 7/1999 |
| JP | 2006-109776 A | 4/2006 |
| JP | 2006-314227 A | 11/2006 |
| JP | 2008-161059 A | 7/2008 |

* cited by examiner

STRUCTURE FOR CONNECTION AND SEPARATION BETWEEN AN ENGINE AND A MAIN UNIT

TECHNICAL FIELD

The present invention relates to a structure for connection and separation between an engine and a main unit, adapted to release coupling by separating a clutch shoe and a clutch drum of a centrifugal clutch interposed in a power transmission shaft.

BACKGROUND ART

A mowing machine has a rotation blade attached to a front end of a power transmission shaft incorporated in an operation rod (main unit). A back end of the power transmission shaft is connected to an engine. The rotation power of the engine is transmitted to the rotation blade. The mowing machine has a throttle lever provided on a handle on the operation rod, and a wire extending from the throttle lever. The wire is connected to a throttle of the engine. The power transmission shaft is configured by connecting an output shaft on the main unit side to a rotation shaft on the engine side by way of a centrifugal clutch. When the output of the engine becomes greater than or equal to certain level, the output shaft and the rotation shaft are coupled by the centrifugal clutch, rotating the rotation blade. When the number of rotations of the output shaft becomes smaller than certain level, the output shaft and the rotation shaft are released by the centrifugal clutch, stopping the rotation blade.

If a structure for connection and separation is arranged between the operation rod and the engine, the operation rod and the engine can be separately packaged, stored, or transported when shipping from a factory. Since the sum of the individual occupying space of the operation rod and the engine is smaller than the occupying space of the mowing machine, it is advantageous in packaging, storage, or transportation.

For example, as in Patent Document 1, by arranging a structure for connection and separation, including a means for connection and separation for the power transmission shaft, between the operation rod and the engine of the mowing machine, the operation rod and the engine can be separated at the structure for connection and separation to reduce the necessary accommodation space in packaging, storage, or transportation when shipping from a factory.

Patent Document 1 does not particularly describe the throttle wire that connects the throttle lever and the engine. This is because the purpose is to accommodate the operation rod and the engine in the same packaging, and to make the arrangement of both parts free as long as the wire is not broken. As described above, it is preferable to completely separate the operation rod and the engine, which are freely connected and separated, so as to accommodate them in different packaging. Therefore, if the operation rod and the engine are freely connected and separated, the throttle wire also needs to be divided, and a structure for connection and separation including a means for connection and separation of the throttle wire becomes necessary. Similarly for a lead wire connecting a stop switch for stopping the engine and a stop circuit of the engine, a structure for connection and separation including the means for connection and separation of the lead wire becomes necessary.

PRIOR ART DOCUMENT

Patent Document

Patent Document 1: Japanese Unexamined Patent Publication No. 11-187738 ([0014] to [0018])

SUMMARY OF THE INVENTION

Problems to be Solved by the Invention

The operation rod and the engine are preferably connectable and separable for the purpose of reducing the accommodation space which is necessary for packaging, storage, or transportation of the mowing machine. However, the structure for connection and separation between the operation rod and the engine requires a separation structure that divides the output shaft extending from the clutch drum of the centrifugal clutch in half. If the specification of the output shaft changes according to the specification of the operation rod, the specification of the separation structure also needs to be changed in accordance with the output shaft. This means that the engine side of the separation structure is arranged on the output shaft extending from the clutch drum. In other words, it is needed to change the specification of the output shaft extending from the clutch drum in order to change the specification of the separation structure. This brings a problem that a great number of engines having different output shaft become necessary even if the engine itself is the same. Thus, in the structure for connection and separation between the operation rod and the engine, the inventory management for a great number of engines may become a burden and may lead to increase in cost as a result. Furthermore, increase in the number of engines that differ from the specification of the output shaft may possibly increase the cost of the engine itself, although the specification of the engine itself is the same.

Furthermore, if the specification of the separation structure of the output shaft is changed according to the specification of the operation rod, it may be required that the means for connection and separation for the throttle wire and the lead wire, which are separately arranged, also change their specifications. This leads to increase in cost of the structure for connection and separation, and also makes the handling inconvenient since different connection and separation procedures are required for every connection and separation structure. Such problems apply to an apparatus in general, such as the mowing machine having the power transmission shaft including; the rotation shaft on the engine side; and the output shaft on the operation rod (main unit) side with the centrifugal clutch interposed therebetween. In this regard, in the general apparatus represented by the mowing machine, the structure for connection and separation between the engine and the main unit that makes packaging, storage, or transportation convenient is reviewed in order to realize a configuration that does not require change in specification of the engine. Also the means for connection and separation for the throttle wire and the lead wire suited to the structure for connection and separation are also reviewed.

Means for Solving the Problems

As a result of reviewing, there is developed a structure for connection and separation between an engine and a main unit, adapted to release coupling by separating a clutch shoe and a clutch drum of a centrifugal clutch interposed in a power transmission shaft, the structure for connection and separation including: an engine side adapter including the clutch shoe, an engine side annular surface and an engine side projection; and a main unit side adapter including the clutch drum, a main unit side annular surface and a main unit side projection, wherein in the engine side adaptor, the clutch shoe is connected to a rotation shaft which is an engine side of the power transmission shaft, the engine side annular surface and the engine side projection are provided on a radially outer side of the clutch drum of the main unit side adaptor to be connected, in the main unit side adapter, the clutch drum is connected to an output shaft which is the main unit side of the power transmission shaft, the main unit side annular surface and the main unit side projection are provided on a radially outer side of the clutch drum, the engine side projection projects in a radial direction from a circle centered on the power transmission shaft as a center, and the main unit side projection projects in a direction radially opposite to the direction in which the engine side projection projects; and when the engine side adapter or the main unit side adapter is relatively rotated about the axis of the power transmission shaft with the engine side annular surface and the main unit side annular surface brought into contact with each other, the engine side projection and the main unit side projection are moved to a back side of each other from the circumferential direction to be engaged in the axial direction of the power transmission shaft.

By assigning the clutch shoe of the centrifugal clutch to the engine side adapter and the clutch drum of the centrifugal clutch to the main unit side adapter, and separating the centrifugal clutch, the structure for connection and separation of the present invention connects and separates the engine side adapter and the main unit side adapter. The engine side adapter and the main unit side adapter are connected by placing the clutch drum over the clutch shoe so that the engine side annular surface and the main unit side annular surface contact each other and relatively moving the engine side adapter or the main unit side adapter about the axis of the power transmission shaft so that the engine side projection and the main unit side projection are moved to a back side of each other from the circumferential direction to be engaged in the axial direction of the power transmission shaft. The engine side projection and the main unit side projection need to be arranged in a pair in the engine side adapter and the main unit side adapter, and may take any shape as long as they are fitted each other by rotating one of the engine side adapter and the main unit side adapter.

The engine side annular surface is an annular (ring-shaped) plane formed radially outward than the clutch drum of the main unit side adapter to be connected, and the main unit side annular surface is an annular (ring-shaped) plane that forms a pair with the engine side annular surface. Both surfaces do not need to be brought into contact entirely when connecting the engine side adapter and the main unit side adapter. Similarly, the shapes of the inner periphery and the outer periphery do not need to be coincided. However, when the engine side adapter and the main unit side adapter are connected, the shape of at least the outer periphery is preferably made the same from the viewpoint of continuing the outer shape of each adapter (continuation of engine side case and main unit side case, to be described later), and enhancing the sensuousness of the outer appearance. Furthermore, when referring to "the engine side projection and the main unit side projection are moved to a back side of each other from the circumferential direction to be engaged in the axial direction of the power transmission shaft", this means that the engine side projection and the main unit side projection are freely movable in the circumferential direction, which relatively rotate the engine side adapter or the main unit side adapter about the axis of the power transmission shaft with the engine side annular surface and the main unit side annular surface brought into contact, but engaged in the direction (axial direction of power transmission shaft) of inhibiting the separation of the engine side adapter and the main unit side adapter.

In order to accurately correspond the engine side projection and the main unit side projection, it is preferable that a connection projection having a circular shape in front view, which projects out concentrically with the axis line of the power transmission shaft and in a direction orthogonal to a plane, is arranged in one of the engine side annular surface and the main unit side annular surface; and a connection recess, which is concentric with the axis line of the power transmission shaft and to which the connection projection is fitted, is arranged on the other one of the engine side annular surface and the main unit side annular surface. Although the engine side adapter and the main unit side adapter make the clutch drum cover the clutch shoe when connecting, the positional relationship of the engine side adapter and the main unit side adapter cannot be uniquely specified since they are not in contact in the normal state. By fitting the connection projection and the connection recess that form a pair each other, the positional relationship of the engine side adapter and the main unit side adapter can be uniquely specified, thus realizing an accurate correspondence between the engine side projection and the main unit side projection.

As for the engine side projection and the main unit side projection, the engine side projection or the main unit side projection projects radially outward from a fixing plate interposed between one of the engine side annular surface or the main unit side annular surface, and the clutch shoe or the clutch drum; and the engine side projection or the main unit side projection projects radially inward from an inner periphery of the other one of the engine side annular surface and the main unit side annular surface. Specifically, (1) the main unit side adapter has a structure in which the main unit side projection projects radially outward from the fixing plate interposed between the main unit side annular surface and the clutch drum; and the engine side adapter has a structure in which the engine side projection projects radially inward from the inner periphery from the engine side annular surface. Alternatively, (2) the engine side adapter has a structure in which the engine side projection projects radially outward from the fixing plate interposed between the engine side annular surface and the clutch shoe; and the main unit side adapter has a structure in which the main unit side projection projects out radially inward from the inner periphery from the main unit side annular surface.

The present invention is explained taking an example of the configuration in which the main unit side projection is projected out from the fixing plate arranged in the main unit side adapter and the engine side projection is projected out from the inner periphery of the engine side annular surface of the engine side adapter. The main unit side projection, which projects radially outward from the fixing plate, projects out at least its distal end portion from the outer side in the radial direction than the clutch drum of the main unit side adapter, at a position projected from one of the main unit side annular surfaces toward the counterpart side. On the other hand, the engine side projection, which projects radially inward from the inner periphery of the engine side annular surface, does not project out its distal end portion to the inner side in the radial direction than the clutch drum of the main unit side adapter. According to this configuration, the main unit side projection is inserted to the inner side than the inner periphery of the engine side annular surface from between the engine side projections to make the engine side annular surface and the main unit side annular surface contact, and the engine side adapter or the main unit side adapter is relatively rotated about the axis of the power transmission shaft, and the main unit side projection is moved to the back side of the engine side projection from the circumferential direction to be engaged in the axial direction of the power transmission shaft. This is the same in the configuration in which the engine side projection is projected out from the fixing plate arranged in the engine side adapter and the main unit side projection is projected out from the inner periphery of the main unit side annular surface of the main unit side adapter.

To maintain the connection state of the engine side adapter and the main unit side adapter connected through the above procedure, it is preferable to engage the stopper projection and the cutout arranged in the engine side adapter and the main unit side adapter are to be engaged. It is preferable that the stopper projection be configured to project out in a direction orthogonal to the face of the engine side annular surface and the main unit side annular surface, and the engagement be controlled by the release button. The release button may be arranged on either an engine side case having the engine side annular surface as a front end face or a main unit side case having the main unit side annular surface as the back end face. The release button is biased radially outward, where when the button is pushed radially inward, the stopper projection is displaced radially inward in cooperation therewith. The cutout, to which the stopper projection engages, is arranged on the inner periphery of one of the engine side annular surface and the main unit side annular surface, and the stopper projection is arranged on the inner periphery of the other one of the engine side annular surface and the main unit side annular surface, so that the engine side adapter and the main unit side adapter engage by engaging the stopper projection and the cutout. Specifically, (1) the release button for displacing the stopper projection radially inward is arranged on the engine side adapter, and the cutout, to which the stopper projection of the release button engages in the circumferential direction, is arranged on the inner periphery of the main unit side annular surface of the main unit side adapter, or (2) the release button for displacing the stopper projection radially inward is arranged on the main unit side adapter, and the cutout, to which the stopper projection of the release button engages in the circumferential direction, is arranged on the inner periphery of the engine side annular surface.

"The engine side case having the engine side annular surface as a front end face" is an element configuring the outer appearance of the engine side adapter, where the clutch shoe, the engine side annular surface, and the engine side projection are accommodated in the engine side case. The front end face of the engine side case is the engine side annular surface. The front end face is continuously formed from the outer periphery of the engine side annular surface. "The main unit side case having the main unit side annular surface as a back end face" is the same. The present invention is explained taking an example of the configuration in which the release button is arranged in the main unit side adapter and the cutout is arranged in the engine side annular surface of the engine side adapter. The stopper projection is provided at a radial position corresponding to the cutout. The release button pushes in the stopper projection radially inward from such a radial position, so that the stopper projection engages to the cutout formed at the inner periphery of the engine side annular surface from the circumferential direction. It is preferable to provide a gradually changing inner periphery on the inner periphery of the engine side annular surface. The gradually changing inner periphery reaches the cutout by gradually reducing the radius from the radial position where the stopper projection is provided. If the engine side adapter or the main unit side adapter is relatively rotated about the axis of the power transmission shaft with the engine side annular surface and the main unit side annular surface brought into contact, the stopper projection can be displaced along the gradually changing inner periphery and the stopper projection can be dropped into the cutout when reaching to the cutout. The gradually changing inner periphery may be extended toward the cutout from a portion between the engine side projections.

The means for connection and separation of the throttle wire applied to the structure for connection and separation of the present invention preferably adapts the following configuration. Namely, the engine side adapter is provided with an engine side slider that moves forward and backward along an engine side trajectory extending in the circumferential direction about the axis of the power transmission shaft on the engine side annular surface, and an engine side wire extending from a throttle of the engine is connected to the engine side slider from a starting end side of the engine side trajectory; a main unit side adapter is provided with a main unit side slider that moves forward and backward along a main unit side trajectory extending in the circumferential direction concentric with the engine side trajectory on the main unit side annular surface, and a main unit side wire extending from a throttle lever is connected from a terminating end side of the main unit side trajectory; and when the engine side adapter or the main unit side adapter is relatively rotated about the axis of the power transmission shaft with the engine side annular surface and the main unit side annular surface brought into contact with each other and the engine side projection and the main unit side projection are engaged in the axial direction of the power transmission shaft, the main unit side slider is brought closer to the engine side slider from an upstream side of the rotation thus causing the main unit side slider at the starting end to engage or be proximate to the engine side slider, the pulling of the main unit side wire being assumed as the pulling of the engine side wire through the engagement of the main unit side slider and the engine side slider that move toward the terminating end by the pulling of the main unit side wire.

The "engine side trajectory extending in the circumferential direction about the axis of the power transmission shaft" includes a linear trajectory facing the tangential direction of the circumference having the axis of the power transmission shaft as the center, and an arcuate trajectory on the circumference. This is the same for the main unit side trajectory. The same type of trajectory is used for both (if one is linear trajectory, the other is also linear trajectory, and if one is arcuate trajectory, the other is also arcuate trajectory). For example, if the engine side trajectory is an arcuate trajectory, the side surface of the engine side slider preferably has an arcuate shape along the inner periphery and the outer periphery of the engine side trajectory, but the side surface of the engine side slider may have a linear shape if the length in the forward/backward moving direction of the engine side slider is sufficiently small and the side surface does not come into pressure contact with the inner periphery and the outer periphery of the engine side trajectory. The engagement of the main unit side slider and the engine side slider are carried out by the projections projected toward the counterpart side, respectively. Therefore, the engine side trajectory and the main unit side trajectory preferably extend concentrically and in the same circumferential direction (same radius), but the engine side trajectory and the main unit side trajectory may extend in different circumferential directions (different radius) as long as they are concentric and the projections are engaged each other. For example, the engine side slider that moves forward and backward along the engine side trajectory does not project out the projection from the engine side trajectory, and the main unit side slider projects out the projection in a range of depth of the engine side trajectory, so that projection of engine side slider is inserted to the engine side trajectory.

The means for connection and separation for the throttle wire according to the present invention overlaps or matches the engine side trajectory and the main unit side trajectory, with the engine side annular surface and the main unit side annular surface brought into contact, and the engine side projection is engaged to the main unit side projection, thereby engaging the main unit side slider that moves toward the terminating end to the engine side slider. Thus, when the main unit side wire extending from the throttle lever is pulled, the main unit side slider moves from the starting end to the terminating end, the engine side slider engaged to the main unit side slider also moves from the starting end to the terminating end, and the engine side slider pulls the engine side wire to open the throttle of the engine. Since the engine side slider is pulled by the engine side wire biased in the returning direction, the engine side slider is pulled by the engine side wire when the throttle lever is loosened, thereby returning the engine side slider to the starting end. The main unit side slider is engaged to the engine side slider and pulled by the engine side slider, and then the main unit slider is returned to the starting end. In order to reliably return the engine side slider and the main unit side slider to the starting end, it is preferable to provide a coil spring or the like for biasing to the starting end.

When referring to "the main unit side slider at the starting end to engage or be proximate to the engine side slider", this refers to a positional relationship in which the main unit side slider and the engine side slider are brought into contact or the main unit side slider engages to the engine side slider immediately after starting to move in the state that the engine side adapter and the main unit side adapter are engaged. Since the means for connection and separation for the throttle wire in the present invention engages the main unit side slider moving toward the terminating end to the engine side slider by bringing the engine side annular surface and the main unit side annular surface into contact and engaging the engine side projection to the main unit side projection, when the engine side adapter or the main unit side adapter is relatively rotated about the axis of the power transmission shaft with the engine side annular surface and the main unit side annular surface brought into contact with each other, the engine side slider approaches from the starting end side of the engine side trajectory and the main unit side slider approaches from the terminating end side of the main unit side trajectory with respect to each other. In this case, even if the main unit side wire is pulled and the main unit side slider is located away from the starting end of the main unit side trajectory, the main unit side slider engages to the engine side slider and they can always be engaged by simply moving the engine slide slider slightly from the starting end of the engine side trajectory in advance.

The means for connection and separation of the lead wire applied to the structure for connection and separation of the present invention preferably adapt the following configuration. Namely, the engine side adapter includes an engine side terminal that moves forward and backward while being biased toward the starting end along a terminal groove extending in a circumferential direction about the axis of the power transmission shaft on the engine side annular surface. The engine side adapter arranges a ground terminal on the starting end side of the terminal groove. The engine side adapter connects an engine side lead wire extending from a stop circuit of the engine to the engine side terminal. The main unit side adapter is provided with a main unit side terminal on the main unit side annular surface on the circumference concentric with the terminal groove. A main unit side lead wire extending from a stop switch is connected to the main unit side terminal. The engine side terminal is brought into contact with the ground terminal at the starting end side to operate the stop circuit in the normal state. When the engine side adapter or the main unit side adapter is relatively rotated about the axis of the power transmission shaft with the engine side annular surface and the main unit side annular surface brought into contact with each other and the engine side projection and the main unit side projection are engaged in the axial direction of the power transmission shaft, the contact of the engine side terminal and the ground terminal is released and the engine side terminal and the main unit side terminal are conducted by moving the engine side terminal engaged to the main unit side terminal from the starting end side, and then the stop circuit is operated in accordance with ON/OFF of the stop switch.

The means for connection and separation for the lead wire of the present invention stops the engine by not only blocking the conduction of the engine side terminal and the main unit side terminal, but also activating the stop circuit if the engine side terminal is grounded. The engine is always stopped if the main unit side adapter and the engine side adapter are separated, and running or stopping state of the engine is controlled by ON/OFF of the stop switch if the main unit side adapter and the engine side adapter are connected. The ground terminal may be configured by a metal terminal arranged at the starting end side of the terminal groove, and if the inner surface (including a case where the engine side case exposed from the through-hole formed on the starting end side of the case is the inner surface) of the case forming the terminal groove is made of metal and has ground potential, the inner surface of the starting end side may be adopted as the ground terminal. The main unit side terminal and the engine side terminal are engaged by the respective projections projecting toward the counterparts. Therefore, the terminal groove and the circumferential trajectory in which the main unit side terminal is provided are preferably concentric and extend in the same circumferential direction (same radius). However, the terminal groove and the circumferential trajectory in which the main unit side terminal is provided may extend in different circumferential directions (different radius) as long as they are concentric and the projections can be engaged each other. Furthermore, the engine side terminal that moves forward and backward along the terminal groove may not project out its projection from an open end (e.g., window of case) of the terminal groove. The main unit side terminal may project out its projection within a range of depth of the terminal groove, and be inserted to the terminal groove or the open end.

Effects of the Invention

The structure for connection and separation between an engine and a main unit of the present invention divides the centrifugal clutch to a clutch shoe and a clutch drum so that the engine side adapter and the main unit side adapter can be connected and separated, whereby specification of the main unit side adapter including the clutch drum to the output shaft can be changed in accordance with the apparatus while having the specification of the engine assembled with the engine side adapter including the clutch shoe common. The problems caused by the increase in the type of engine thus can be resolved. This means that the engine of the same specification can be used, for example, even if the specification of the mowing machine (specification of main unit) is different. This also means that the engine of the same specification can be used with respect to different apparatuses by standardizing the engine side adapter and the main unit side adapter. The present invention thus has an effect of making the standard of the engine with respect to various apparatuses common.

The means for connection and separation for the throttle wire and the lead wire in the present invention is suited for the structure for connection and separation of the present invention making a standard of the engine common. The means for connection and separation for the wire of the present invention enables the movement of the main unit side slider to be transmitted to the engine side slider without coupling them together by adopting a configuration in which the engine side slider and the main unit side slider engage to each other. This has an effect in that the connection and separation task of the throttle wire is not separately required thus facilitating the connection and separation task of the connection and separation structure. The means for connection and separation for the lead wire in the present invention can stop the engine particularly at the stage where the main unit side adapter is not connected to the engine side adapter, and thus has an effect of improving the safety in handling the connection and separation structure.

EMBODIMENTS FOR CARRYING OUT THE INVENTION

Figure 1:
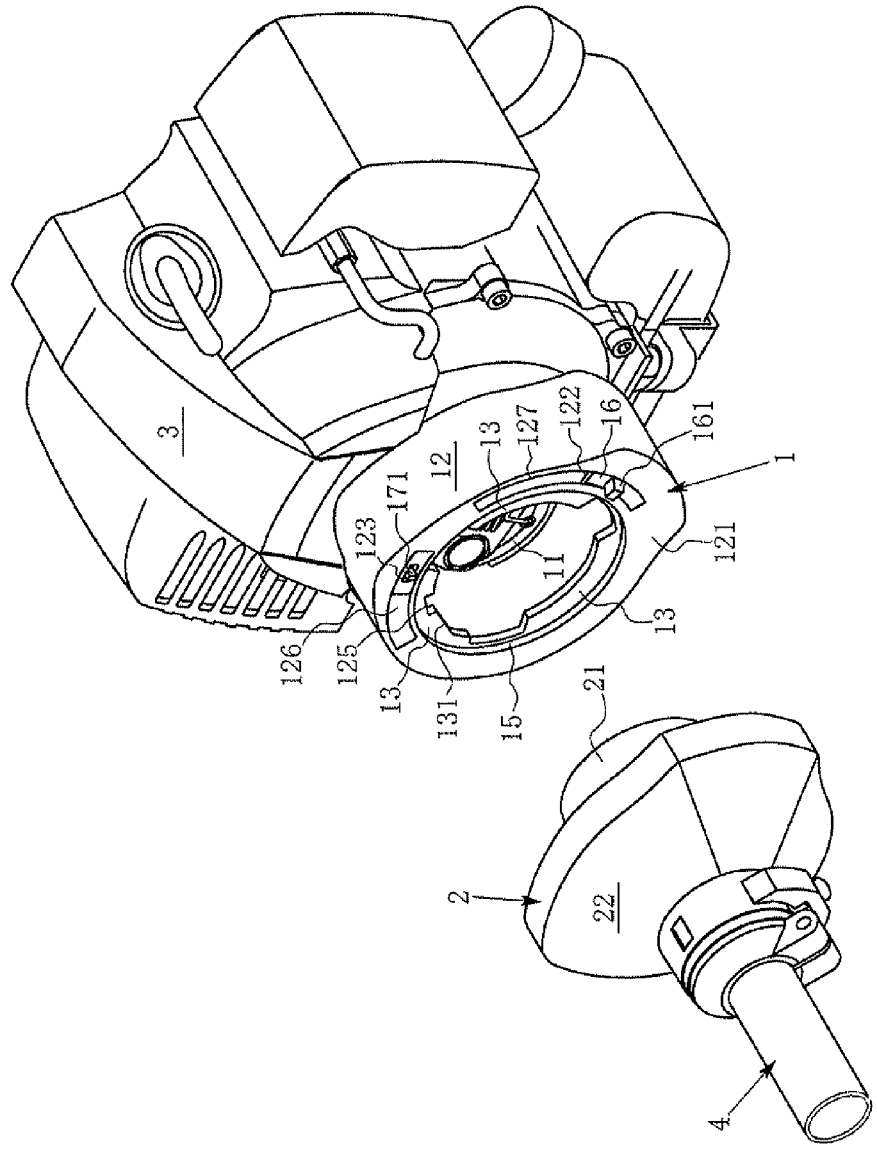
FIG. 1 is a perspective view seen from the front right side of a mowing machine applied with a structure for connection and separation of the present invention, illustrating a state in which an engine side adapter and a main unit side adapter are separated.

Embodiments for carrying out the invention will be hereinafter described with reference to the drawings. The present example is a mowing machine in which a means for connection and separation for throttle wire and a means for connection and separation for a lead wire are combined to a connection and separation structure of the present invention. A centrifugal clutch is connected or separated at a clutch shoe 11 and a clutch drum 21. An operation rod 4 extending from a main unit side adapter 2 corresponds to the main unit as referred to in the present invention. As illustrated in FIG. 1 to FIG. 4, the structure for connection and separation of the present example is configured by an engine side adapter 1 at the front surface of the engine 3 and the main unit side adapter 2 at the back end of the operation rod 4. The operation rod 4 of the mowing machine incorporates an output shaft 32 (see FIG. 3), which is the main unit side of a power transmission shaft. A rotation blade (not shown) is attached to the front end of the operation rod. The rotation blade is rotatably driven by the output shaft 32. The operation rod 4 is attached with an operation handle (not shown) including a throttle lever and a stop switch.

The engine side adapter 1 includes an engine side case 12 that incorporates the clutch shoe 11, which is connected with a rotation shaft 31 extending from the engine 3; and an engine side annular surface 121 that becomes a front end face of the engine side case 12. A circular ring-shaped step is provided on the inner circumference of the engine side annular surface 121 to form a connection recess 15. Three engine side projections 13 are projected radially inward from the inner periphery of the connection recess 15. An engine side wire 33 and an engine side lead wire 34 are guided to the inside of the main unit side case 22 from a gap between the main unit side case 22 and the engine 3. The connection recess 15 refers to the entire inner circumference of the engine side annular surface 121 through the circular ring-shaped step, that is, the range including the engine side projections 13 from the circular ring-shaped step, where a reference numeral is denoted to the circular ring-shaped step in the figure since the portion important in fitting with a connection projection 25 is the circular ring-shaped step. In order to connect the engine side adapter 1 and the main unit side adapter 2, the main unit side projections 23 are inserted to the inner side of the engine side case 12 from between the engine side projections 13. Then the main unit side projections are moved to the back side of the engine side projections 13. A projecting end (inner peripheral end) of the engine side projection 13 is on the outer side in the radial direction than the clutch drum 21 of the main unit side adapter 2. The engine side annular surface 121, which is on the outer peripheral side than the engine side projection 13, is of course also on the outer side in the radial direction than the clutch drum 21. Therefore, there is nothing that interferes with the clutch drum 21 when connecting the engine side adapter 1 and the main unit side adapter 2.

The engine side annular surface 121 is provided with an engine side trajectory 122, which is an arcuate trajectory on a circumference having the rotation shaft 31 as a center. The engine side trajectory 122 is arranged on the right side (when viewed from front side) facing the engine side annular surface 121 (see FIG. 4). The engine side slider 16 has a configuration in which a slider projection 161 is arranged in a square block to which an engine side wire 33 extending from the engine 3 is connected. The engine side wire 33 is connected from the starting end side of the engine side trajectory 122. Since the block is fitted to the engine side trajectory 122, the slider 16 moves forward and backward (see FIG. 16 and FIG. 17) along the engine side trajectory 122 with the slider projection 161 slightly (range of depth of slider guiding path 224 connecting to main unit side trajectory 222 to be described later) projecting from the engine side annular surface 121. The engine side slider 16 is pulled by the throttle through the engine side wire 33 and biased toward the starting end side. In the present example, a slider guiding path 127 continuing to the engine side trajectory 122 is arranged on the upstream side in the rightward rotation of the engine side trajectory 122 on which the engine side slider 16 moves forward and backward. When connecting the engine side adapter 1 and the main unit side adapter 2, the slider guiding path 127 acts as an guiding path for approaching the main unit side slider 26 with respect to the slider projection 161 of the engine side slider 16 along the slider guiding path 127 by receiving the slider projection 261 of the main unit side slider 26.

Figure 4:
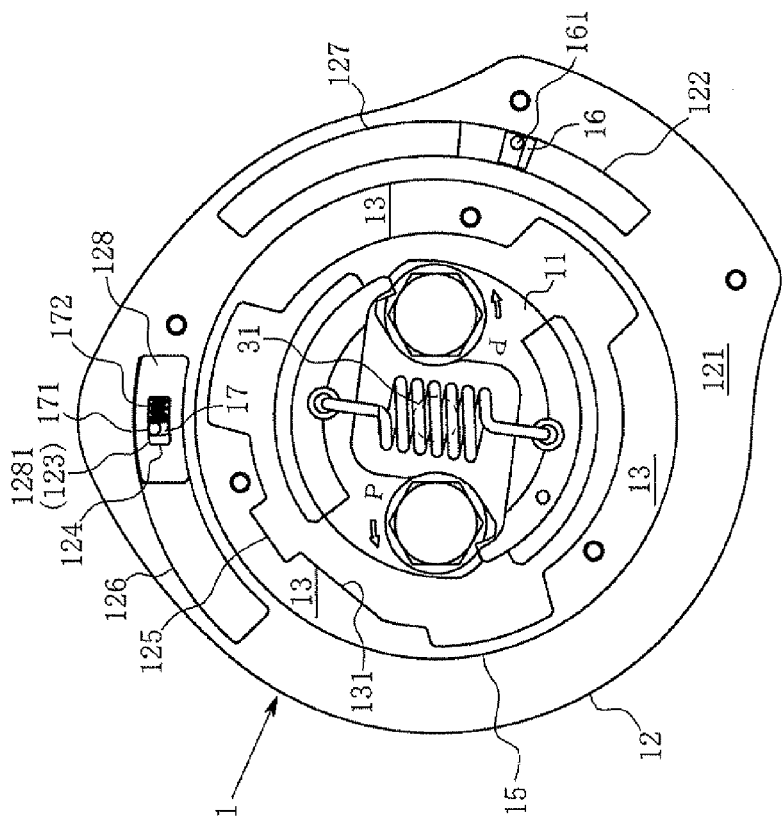
FIG. 4 is a front view seen from the front side of the engine side adapter of the present example.

The engine side annular surface 121 has a terminal groove 123 (in FIG. 1 and FIG. 4, terminal groove 123 refers to a window 1281 of resin groove case 128 from which a terminal projection 171 is exposed. See FIG. 18 and FIG. 19 for the terminal groove 123 which is a space inside the groove case 128) which is an arcuate trajectory on a circumference having the rotation shaft 31 as the center arranged on the upper side (when viewed from front side) facing the engine side annular surface 121 (see FIG. 4). The engine side terminal 17 has a configuration in which the terminal projection 171 is arranged in a square block that is always electrically in contact with a terminal return spring 172 to which an engine side lead wire 34 extending from a stop circuit (not shown) is connected. By fitting the block to the terminal groove 123, the engine side terminal 17 moves forward and backward along the terminal groove 123 without projecting out the terminal projection 171 from the engine side annular surface 121 (see FIG. 18 and FIG. 19). The engine side case 12 of the present example is formed with metal that conducts to the engine 3. The terminal groove 123 is a space in the resin (insulating) groove case 128 including a window 1281 for exposing the terminal projection 171, and a through-hole 1282 for projecting out a contact end 173 of the engine side terminal 17. The groove case 128 is attached to the inner side of the engine side annular surface 121. The projecting portion of the engine side annular surface 121 is exposed from the through-hole 1282 of the groove case 128, in which the projecting portion becomes a ground terminal 124. The ground terminal 124 becomes the inner surface of the starting end side. Since a return spring conductive with respect to the engine side lead wire 34 is interposed between the surface on the opposite side of the contact end 173 of the engine side terminal 17 and the inner surface of the terminating end side of the terminal groove 123, it is biased toward the starting end side in the normal state. In the present example, a terminal guiding path 126 continuing to the terminal groove 123 is arranged toward the upstream side of the rightward rotating direction of the terminal groove 123 in which the engine side terminal 17 moves forward and backward. When connecting the engine side adapter 1 and the main unit side adapter 2, the terminal guiding path 126 prevents the terminal projection 271 from interfering with the engine side annular surface 121 by receiving the terminal projection 271 of the main unit side terminal 27. The terminal guiding groove 126 acts as a guide path for approaching the terminal projection 271 of the main unit side terminal 27 with respect to the terminal projection 171 of the engine side terminal 17.

Figure 12:
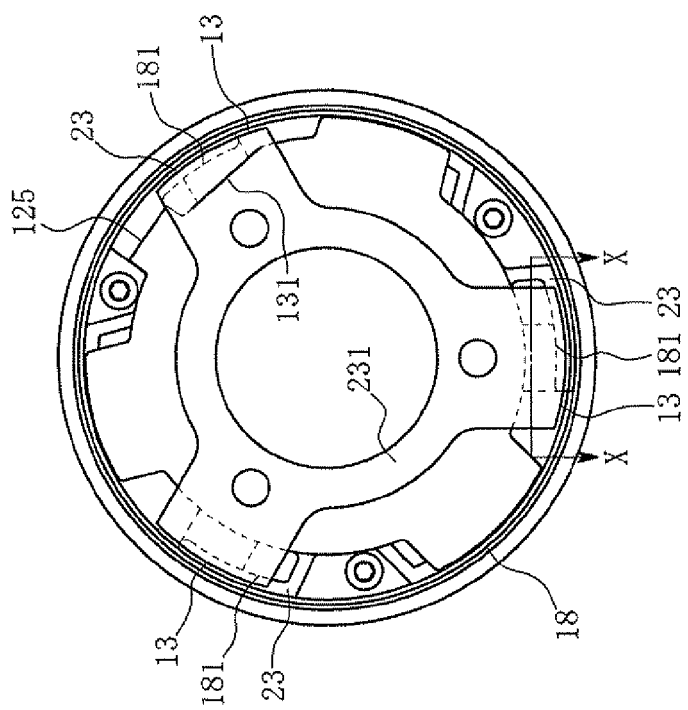
FIG. 12 is a partial rear view seen from the back side of the main unit side projection and the engine side projection illustrating positional relationship of the main unit side projection and the engine side projection in which connection of the engine side adapter and the main unit side adapter of the present example has completed.
Figure 13:
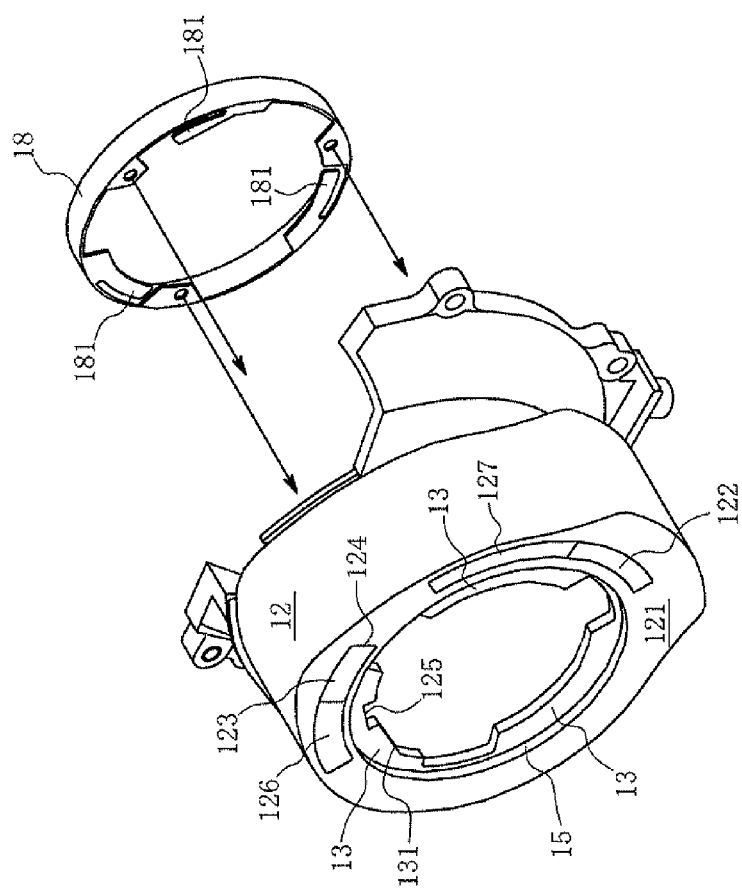
FIG. 13 is a partial perspective view seen from the front right side illustrating the attachment relationship of the holding spacer with respect to the engine side case.
Figure 14:
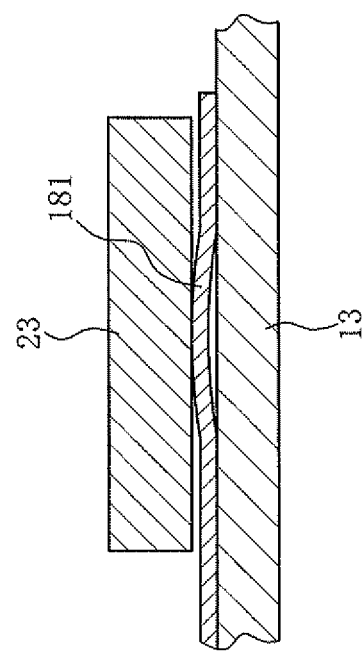
FIG. 14 is a partial cross-sectional view taken along X-X in FIG. 12 illustrating the state that the main unit side projection is the elastically supported by the holding spacer.

In the present example, for the purpose of suppressing rattling of the main unit side projection 23 that engages to the engine side projection 13, a holding spacer 18 including a plate spring 181 interposed between the engine side projection 13 and the main unit side projection 23 is attached to the back surface side of the engine side projection 13 (see FIG. 12). The holding space 18 is a collar made of metal and projecting circular ring-shaped flange inward from its front edge, and is formed with plate spring 181 by cutting out one part of the flange (see FIG. 13). The plate spring 181 of the present example has a cross-sectional shape (see FIG. 14) in which the middle is bulged toward the back side, and is arranged at three areas in a positional relationship of being sandwiched by the engine side projections 13 and the main unit side projections 23, which form a pair when connection of the engine side adapter 1 and the main unit side adapter 2 is completed. When the engine side adapter 1 and the main unit side adapter 2 are connected, the main unit side projection 23 is pushed backward by the bulging of the plate spring 181 and is elastically supported with respect to the engine side projection 13, so that consequently, the rattling of the main unit side projection 23 can be suppressed.

Figure 15:
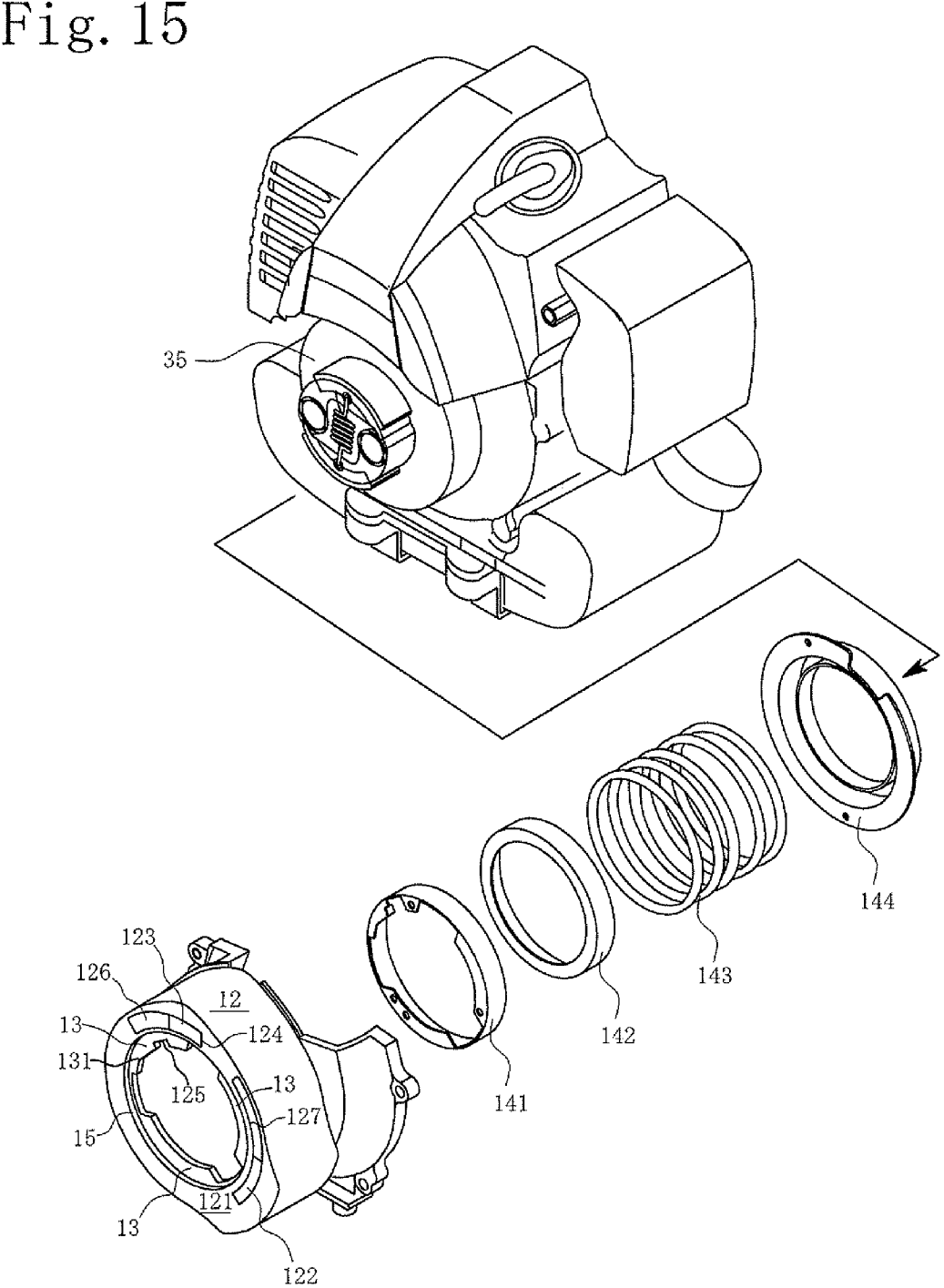
FIG. 15 is an exploded perspective view illustrating an example in which the main unit side projection is elastically supported by a coil spring with respect to the engine side projection.

As illustrated in FIG. 15, the configuration which suppress the rattling by biasing the main unit side projection 23 with respect to the engine side projection 13 using the coil spring 143 is abatable instead of the plate spring 181 of the present example. Specifically, a retainer 141, a thrust ring 142, a coil spring 143, and a spring receiving seat 144 are interposed between the base portion 35 of the engine and the engine side case 12 to push the main unit side projection 23 against the engine side projection 13 from the back side of the engine side case. The retainer 141 is a member formed with an opening substantially the same shape as the engine side projection 13 when seen from the front surface, and is interposed between the engine side projection 13 and the main unit side projection 23 to prevent the members from wearing.

The main unit side adapter 2 includes a main unit side annular surface 221 as a back end face of the main unit side case 22. The connection projection 25 which is a circular ring-shaped member is arranged along the inner circumference of the main unit side annular surface 221. The clutch drum 21 is connected to the distal end of the output shaft 32 projected out from the center of the connection projection 25. Three main unit side projections 23 project radially outward from the fixed plate 231 attached between the main unit side annular surface 221 and the clutch drum 21. The fixed plate 231 is a doughnut-shaped plate member with an opening for passing the output shaft 32, and is fixed with a bolt with respect to the main unit side annular surface 221 (see FIG. 3 and FIG. 20 to FIG. 22). The main unit side wire 41 and the main unit side lead wire 42 are inserted to the protective tube 43 (see FIG. 8) and guided from the front surface of the main unit side case 22 to the interior of the main unit side case 22. The connection projection 25 corresponds to a range including the entire inner circumference of the circular ring-shaped member, but since the end edge of the circular ring-shaped member is important in fitting with the connection recess 15, a reference numeral is denoted on the end edge of the circular ring-shaped member in the figure. Since the main unit side adapter 2 of the present example has the main unit side annular surface 221, the main unit side projection 23, and the clutch drum 21 arranged in multistage in the direction parallel to the power transmission shaft (rotation shaft 31 and output shaft 32), when the engine side adapter 1 and the main unit side adapter 2 are connected with the main unit side annular surface 221 and the engine side annular surface 121 brought into contact with each other, the clutch drum 21 covers the clutch shoe 11 in the recessed portion of the engine side case 12. The main unit side projection 23 is inserted to the inner side of the engine side case 12 from between the engine side projections 13 to move to the back side of the engine side projection 13. The projecting end (outer peripheral end) of the main unit side projection 23 is on the outer side in the radial direction than the clutch drum 21. Furthermore, since the main unit side annular surface 221 is arranged in a range surrounding the projecting end of the main unit side projection 23, there is nothing interfering with the clutch drum 21 when connecting the engine side adapter 1 and the main unit side adapter 2.

Figure 3:
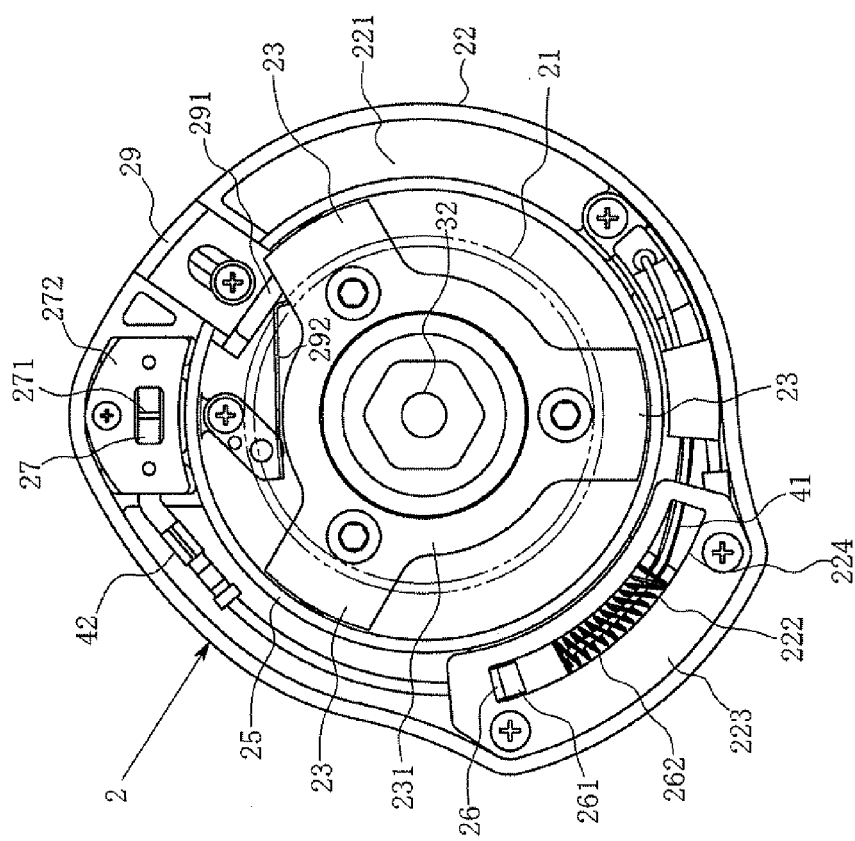
FIG. 3 is a rear view seen from the back side of the main unit side adapter of the present example.

The main unit side annular surface 221 is a virtual surface formed by connecting the respective plane of the back end face outer peripheral edge portion of the engine side case 12, the trajectory block 223 including the main unit side trajectory 222, and the terminal block 272 including the main unit side terminal 27 (precisely, trajectory block 223 and terminal block 272 are slightly on the back side with respect to the back end face outer peripheral edge portion of the engine side case 12 in view of clearance). The trajectory block 223 is attached to the lower left (when viewed from back side) facing the main unit side annular surface 221, and forms the main unit side trajectory 222 which is the arcuate trajectory on the circumference having the output shaft 32 as the center on the main unit side annular surface 221 (see FIG. 3). The main unit side slider 26 has a configuration in which the slider projection 261 is arranged in a square block to which the main unit side wire 41 extending from the throttle lever (not shown) is connected from the terminating end side of the main unit side trajectory 222. The block is fitted to the main unit side trajectory 222, the slider projection 261 is slightly projected out from the main unit side annular surface 221 (range of depth of slider guiding path 127 continuing to engine side trajectory 122 described above), and the main unit side slider 26 is moved forward and backward along the main unit side trajectory 222 (see FIG. 16 and FIG. 17). A slider return spring 262 is interposed between the main unit side slider 26 and the terminating end side of the main unit side trajectory 222 to always bias toward the starting end side. In the present example, a slider guiding path 224 continuing to the main unit side trajectory 222 is arranged on the upstream side of the rightward rotation (upstream side in leftward rotation since FIG. 3 is viewed from back side) of the main unit side trajectory 222 on which the main unit side slider 26 moves forward and backward. The slider guiding path 224 allows to project out the slider projection to the guiding path by receiving the slider projection 161 of the engine side slider 16 when connecting the engine side adapter 1 and the main unit side adapter 2. The slider guiding path 224 thus becomes an guiding path for approaching the slider projection 161 of the engine side slider 16 with respect to the slider projection 261 of the main unit side slider 26.

The terminal block 272 is attached to the upper side (when viewed from the back side) facing the main unit side annular surface 221, and includes the main unit side terminal 27 on the circumference concentric with the engine side terminal 17 described above (see FIG. 3). The main unit side terminal 27 is a metal projection piece, to which the main unit side lead wire 42 extending from the stop switch (not shown) attached to the throttle lever is connected, and is fixed to the terminal block 272. Since the terminal block 272 is attached to the main unit side case 22 and is fixed, the main unit side terminal 27 is fixed to the main unit side annular surface 221 (see FIG. 18 and FIG. 19). Since the engine side terminal 17 is merely pushed to move the engine side terminal 17 away from the ground terminal 124 (projection of engine side annular surface 121 exposed from through-hole 1282 of resin case) provided on the starting end side of the terminal groove 123 when a connection of the engine side adapter 1 and the main unit side adapter 2 is completed, the main unit side terminal 27 is fixed to the main unit side annular surface 221.

Figure 20:
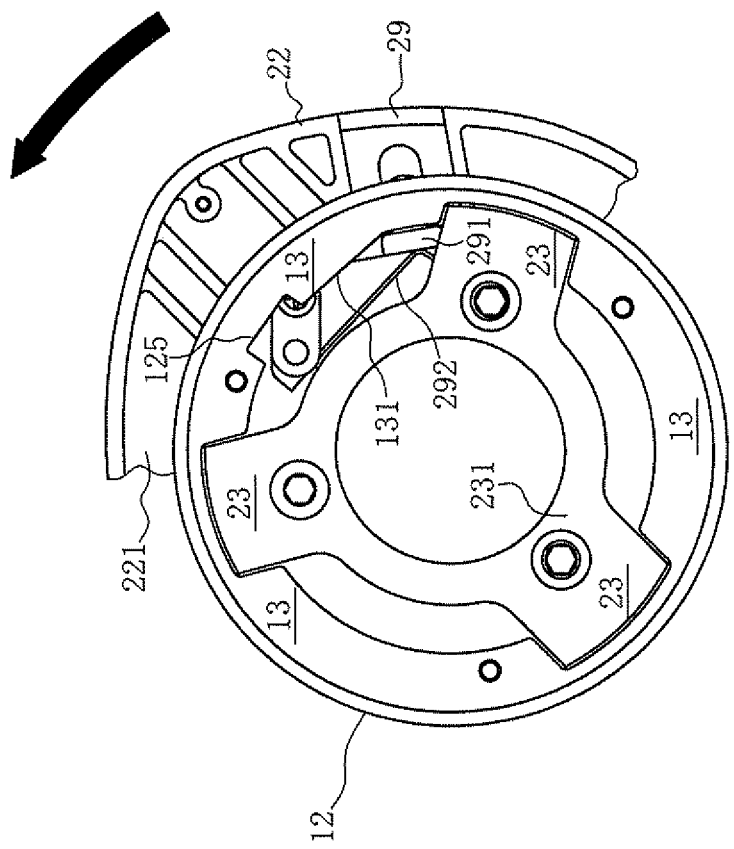
FIG. 20 is rear view of a release button seen from the back side in which the engine side adapter and the main unit side adapter of the present example begin to connect.
Figure 21:
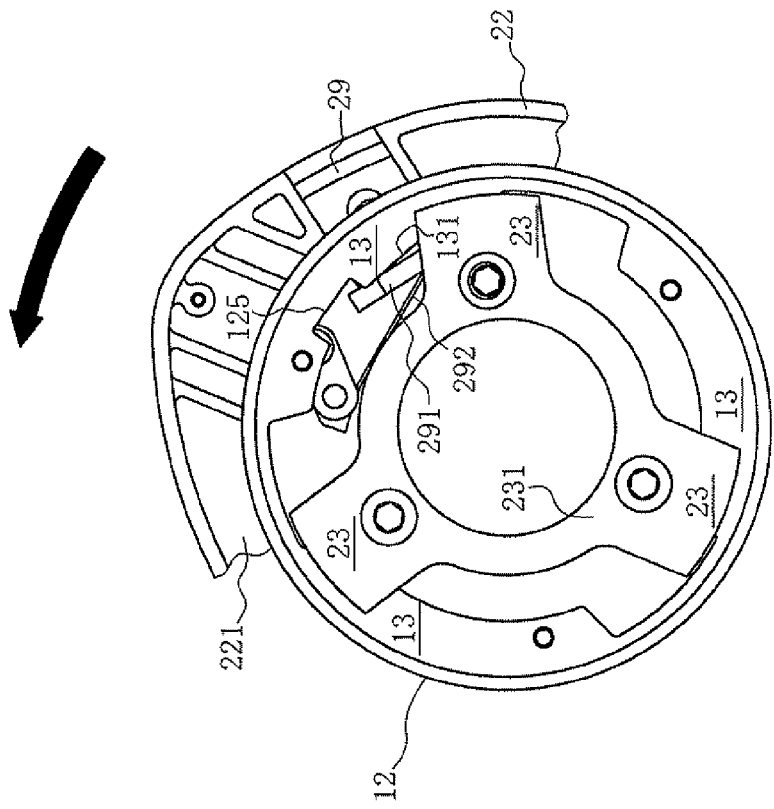
FIG. 21 is rear view of the release button seen from the back side in which connection of the engine side adapter and the main unit side adapter of the present example is in midstream.
Figure 22:
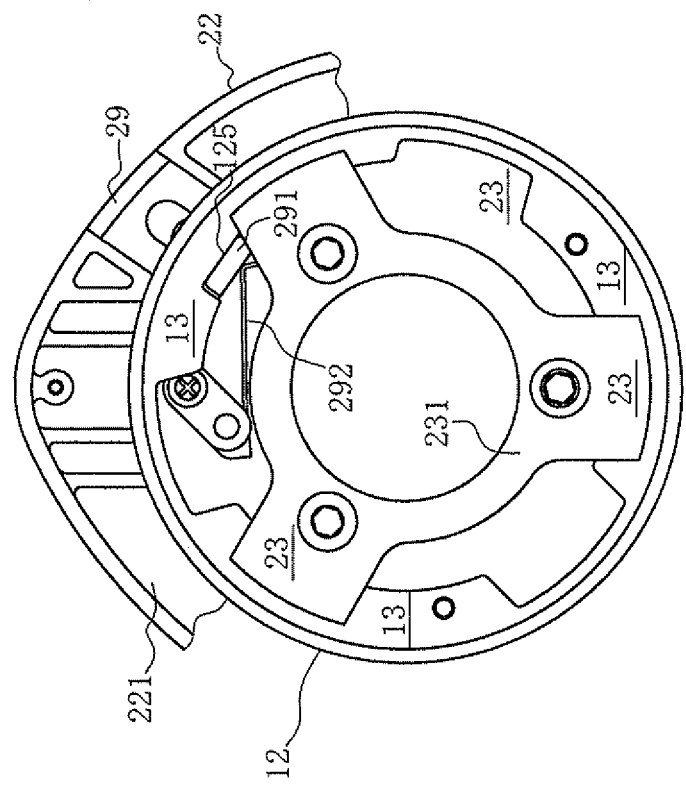
FIG. 22 is rear view of the release button seen from the back side in which connection of the engine side adapter and the main unit side adapter of the present example has completed.

As illustrated in FIG. 20 to FIG. 22, the engine side adapter 1 and the main unit side adapter 2 of the present example include a release button 29 on the main unit side adapter 2, and includes a cutout 125 corresponding to the release button 29 on the engine side adapter 1 to maintain the connection state and release the connection state. The release button 29 restricts the relative rotation of the engine side adapter 1 and the main unit side adapter 2 and maintains the connection state thereof by engaging a stopper projection 291 to the cutout 125 from the peripheral direction when a connection of the engine side adapter 1 and the main unit side adapter 2 is completed. The connection state is released by pushing in the release button 29 from the surface of the main unit side case 22 and releasing the engagement with respect to the cutout 125. If the pushing in from the surface of the main unit side case 22 is stopped to release the connection state, the pushed release button 29 is pushed back radially outward and automatically returns to the original state by a plate spring 292 for returning the button attached to the inner periphery of the connection projection 25

The connecting procedure of the structure for connection and separation of the present example will now be described. The connection of the engine side adapter 1 and the main unit side adapter 2 follows the procedure of inserting the main unit side projections 23 of the main unit side adapter 2 from between the engine side projections 13 of the engine side adapter 1, bringing the engine side annular surface 121 and the main unit side annular surface 221 in contact with each other and relatively rotating the engine side adapter 1 and the main unit side adapter 2 respectively toward the right, and engaging the main unit side projection 23 to the engine side projection 13 of the engine side adapter 1 in the axial direction of the power transmission shaft (rotation shaft 31 and output shaft 32). For connecting the engine side adapter 1 and the main unit side adapter 2, the respective adapters merely need to be relatively rotated toward the right. However, according to the mowing machine of the present example, it is usual to fix a position of the engine 3 and rotate the operation rod 4, which is the main unit, toward the right to connect the engine side adapter 1 and the main unit side adapter 2. Therefore, a case of rotating the main unit side adapter 2 toward the right with respect to the engine side adapter 1 for connection will be specifically described below. The illustrations of FIG. 5 to FIG. 9 have the same purpose.

Figure 2:
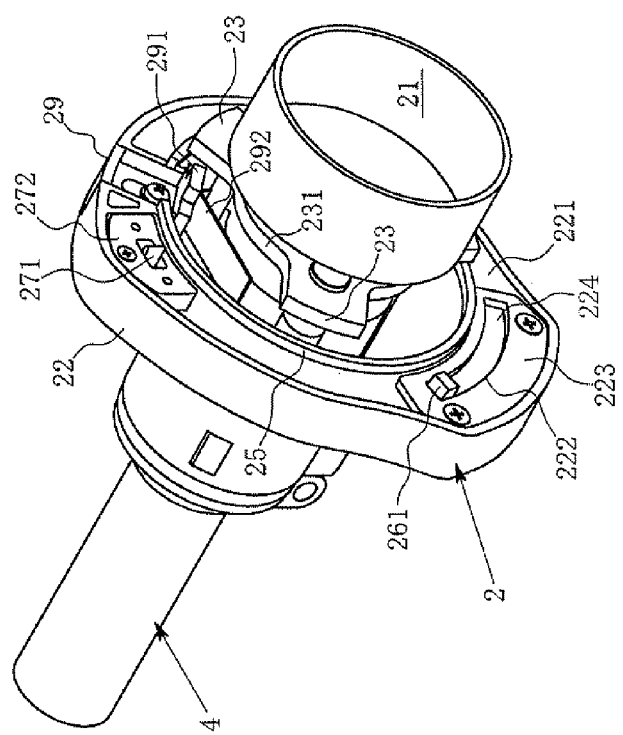
FIG. 2 is a perspective view seen from the back right side of the main unit side adapter of the present example.
Figure 5:
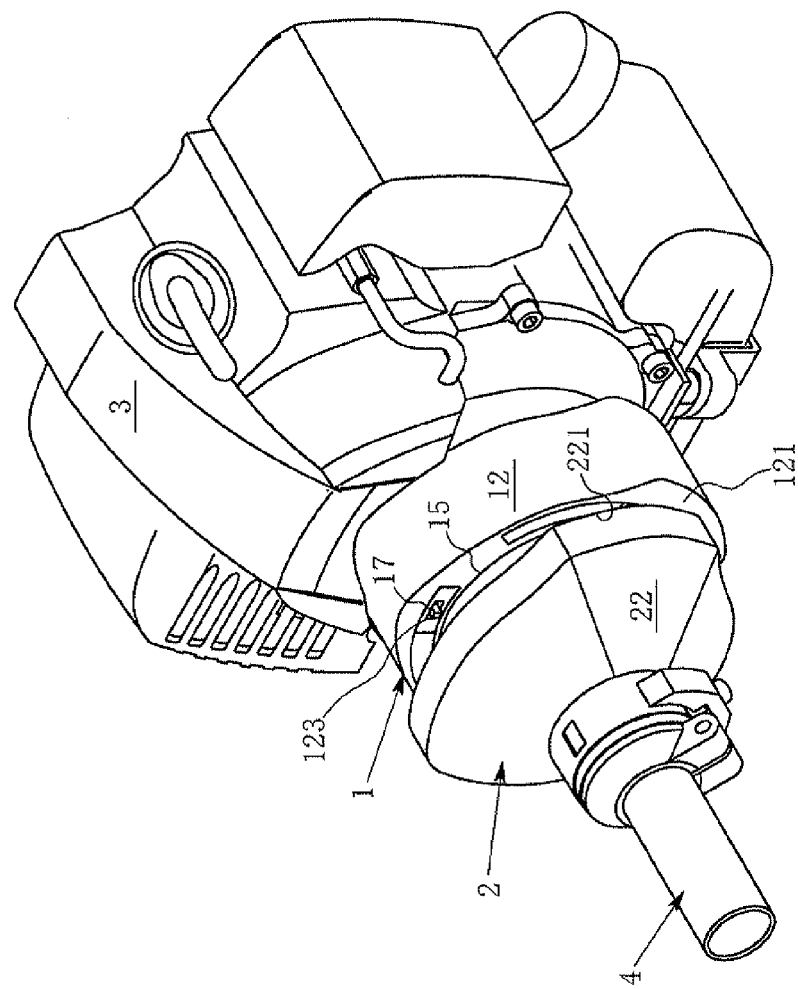
FIG. 5 is a perspective view corresponding to FIG. 1 seen from the front right side of the engine side adapter and the main unit side adapter of the present example in which the engine side adapter and the main unit side adapter begin to connect.
Figure 6:
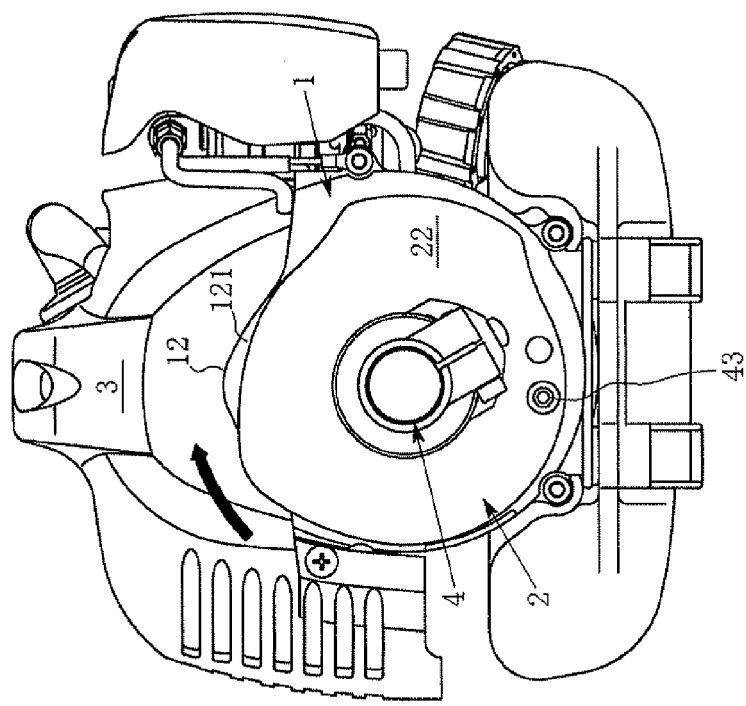
FIG. 6 is a front view seen from the front side of the engine side adapter and the main unit side adapter of the present example in which the engine side adapter and the main unit side adapter begin to connect.
Figure 10:
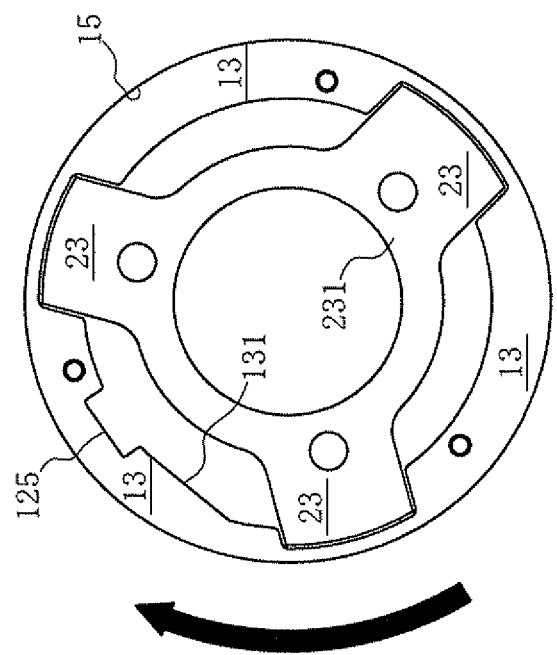
FIG. 10 is a partial front view seen from the front side of the main unit side projection and the engine side projection illustrating positional relationship of the main unit side projection and the engine side projection in which the engine side adapter and the main unit side adapter of the present example begin to connect.
Figure 17:
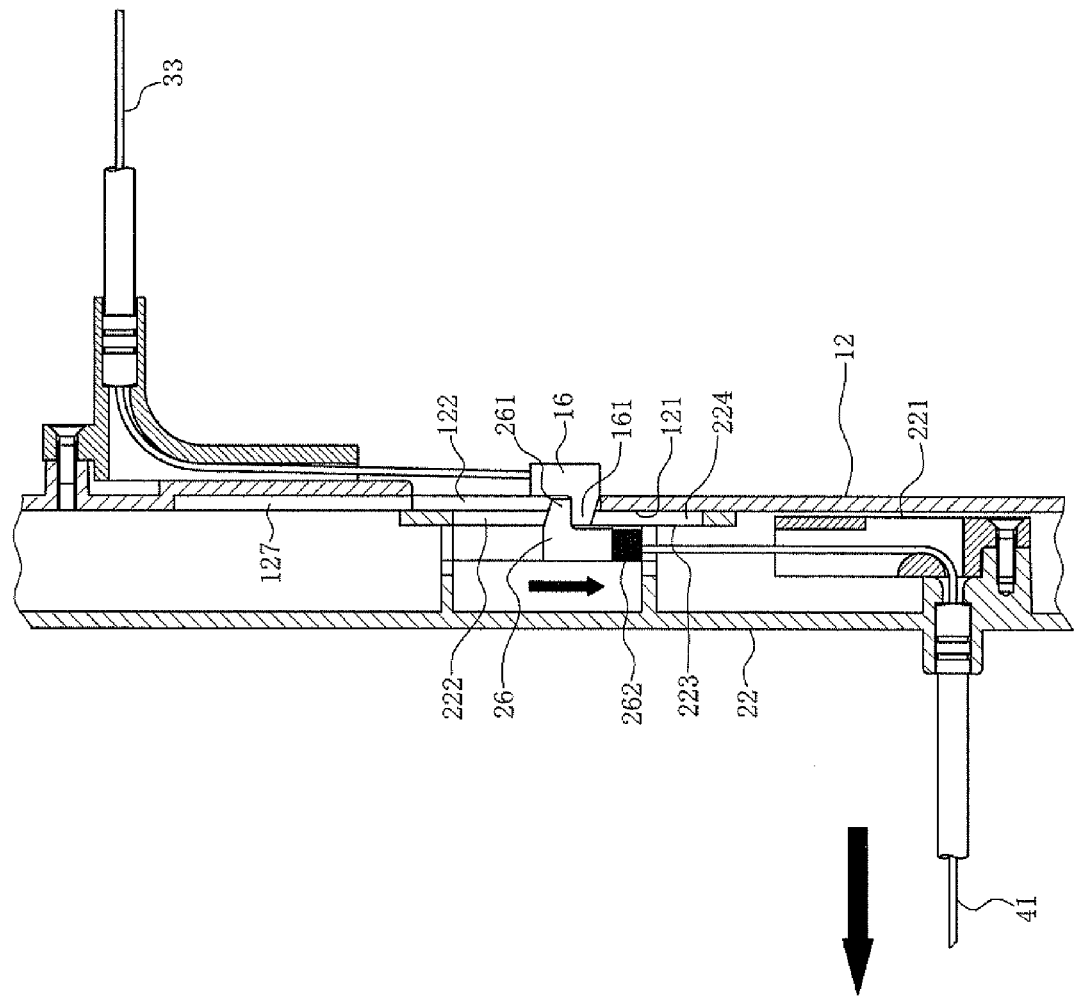
FIG. 17 is a partial cross-sectional view illustrating the means for connection and separation for the throttle wire in which the throttle lever is pulled.

As illustrated in FIG. 5 and FIG. 6, the main unit side projections 23 are inserted from between the engine side projections 13 of the engine side adapter 1 with the main unit side adapter 2 slightly tilted to the left with respect to the engine side adapter 1 (see FIG. 10). In this state, the engine side slider 16 is positioned at the starting end side of the engine side trajectory 122, and the main unit side slider 26 is positioned at the starting end side of the main unit side trajectory 222 (see FIG. 3 and FIG. 4). The slider projection 161 of the engine side slider 16 is projected to the slider guiding path 224 continuing to the main unit side trajectory 222, and the slider projection 261 of the main unit side slider 26 is projected to the slider guiding path 127 continuing to the engine side trajectory 122 (see FIG. 15). As illustrated in FIG. 2, FIG. 4, and FIG. 17, the engine side terminal 17 is positioned at the starting end side of the terminal groove 123 to bring the contact end 173 into contact with the ground terminal 124. The main unit side terminal 27 projects to the terminal guiding path 126 continuing to the terminal groove 123. When the main unit side projections 23 of the main unit side adapter 2 are inserted from between the engine side projections 13 of the engine side adapter 1, the engine side annular surface 121 and the main unit side annular surface 221 come into contact with each other and at the same time the connection projection 25 of the main unit side adapter 2 fit into the connection recess 15 of the engine side adapter 1. By the fitting of the connection projection 25 and the connection recess 15, the main unit side adapter 2 can rotate toward the right about the power transmission shaft (rotation shaft 31 and output shaft 32) without shifting the positional relationship with respect to the engine side adapter 1.

Figure 7:
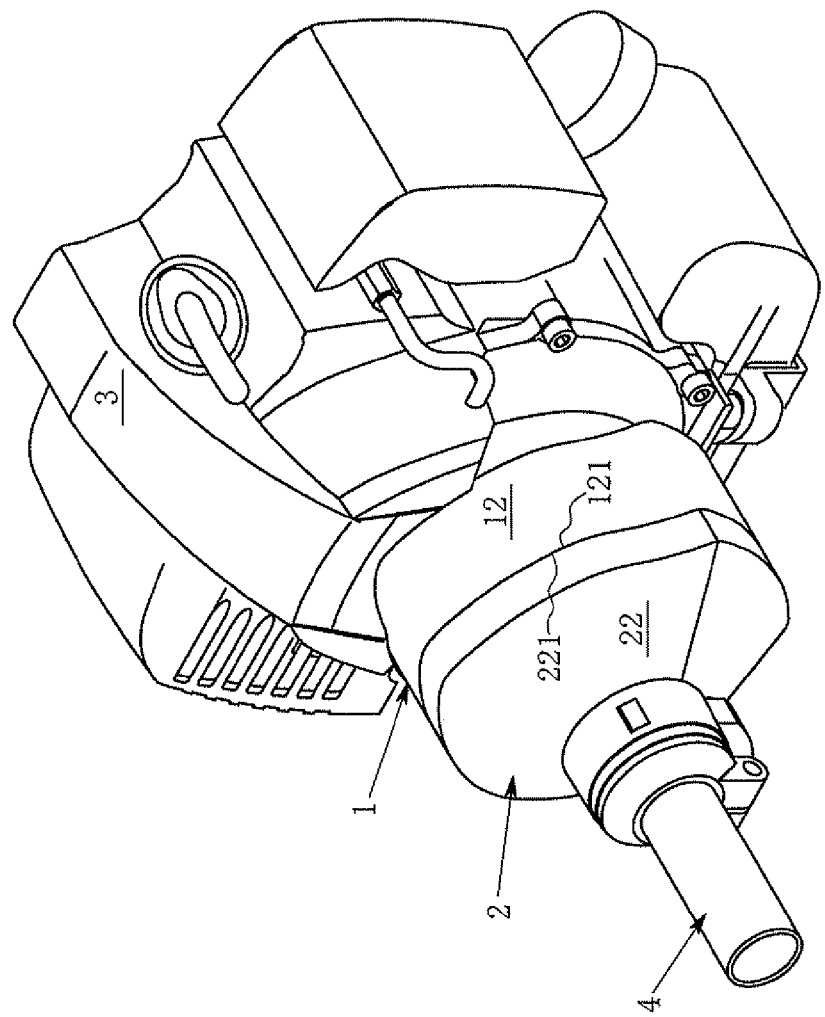
FIG. 7 is a perspective view corresponding to FIG. 1 seen from the front right side of the engine side adapter and the main unit side adapter of the present example in which connection of the engine side adapter and the main unit side adapter has completed.
Figure 8:
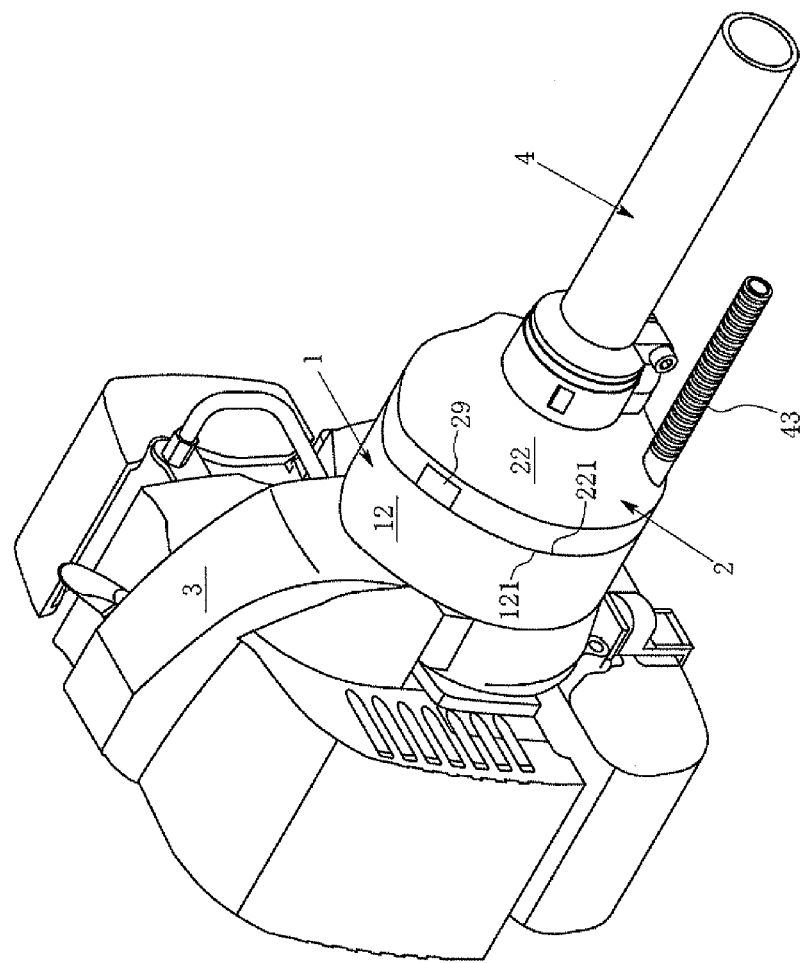
FIG. 8 is a perspective view seen from the front left side of the engine side adapter and the main unit side adapter of the present example in which connection of the engine side adapter and the main unit side adapter is completed.
Figure 9:
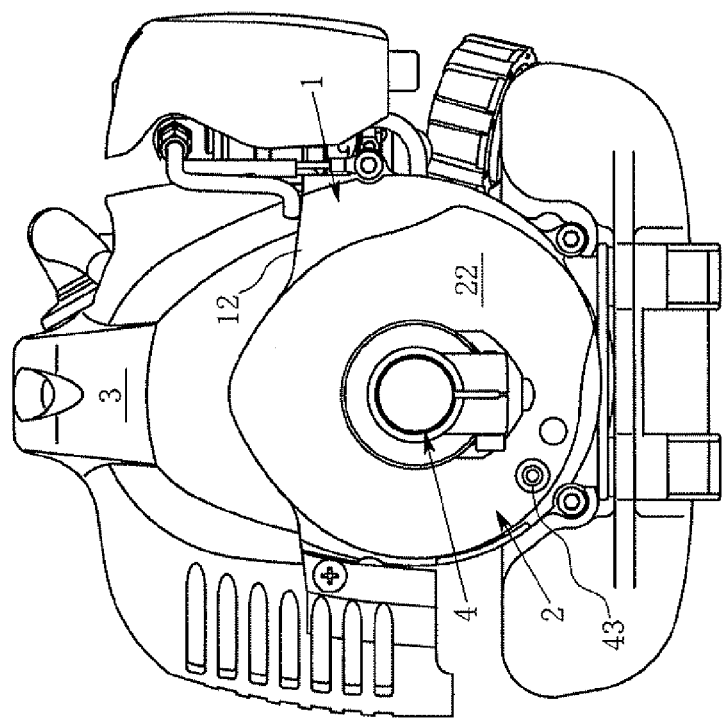
FIG. 9 is a front view corresponding to FIG. 6 seen from the front side of the engine side adapter and the main unit side adapter of the present example in which connection of the engine side adapter and the main unit side adapter has completed.
Figure 11:
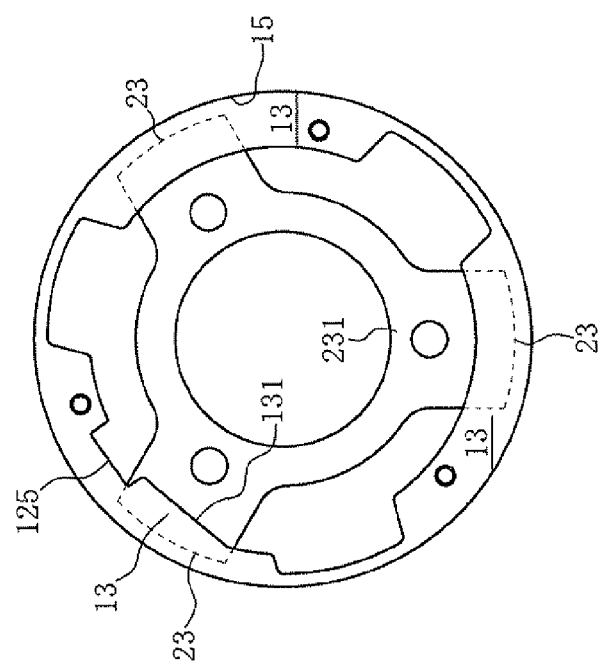
FIG. 11 is a partial front view seen from the front side of the main unit side projection and the engine side projection illustrating positional relationship of the main unit side projection and the engine side projection in which connection of the engine side adapter and the main unit side adapter of the present example has completed.

As illustrated in FIG. 7 to FIG. 9, when the main unit side adapter 2 is rotated toward the right with respect to the engine side adapter 1, the main unit side projections 23 move in the circumferential direction on the back side of the engine side projections 13, and the engine side projection 13 and the main unit side projection 23 engage in the axial direction of the power transmission shaft (rotation shaft 31 and output shaft 32) (see FIG. 11). The engine side projections 13 and the main unit side projections 23 in the present example interpose a plate spring 181 of the holding spacer 18 therebetween when they are engaged, as described above, so that the main unit side projections 23 are elastically supported with respect to the engine side projections 13 and the rattling is prevented (see FIG. 12, FIG. 13). The release button 29 is pulled radially inward when the stopper projection 291 slidably comes into contact with the gradually changing inner periphery 131, where the stopper projection 291 depresses and engages in the circumferential direction with respect to the cutout 125 formed at the end of the gradually changing inner periphery 131. The rightward rotation of the main unit side adapter 2 with respect to the engine side adapter 1 is restricted by the engagement of the stopper projection 291 of the release button 29 to the cutout 125 formed on the inner circumference of the engine side annular surface 121. In other words, the release button 29 not only acts to maintain the connection state of the engine side adapter 1 and the main unit side adapter 2 and release such maintaining state, but also to regulate the rotation at the time of connection.

Figure 16:
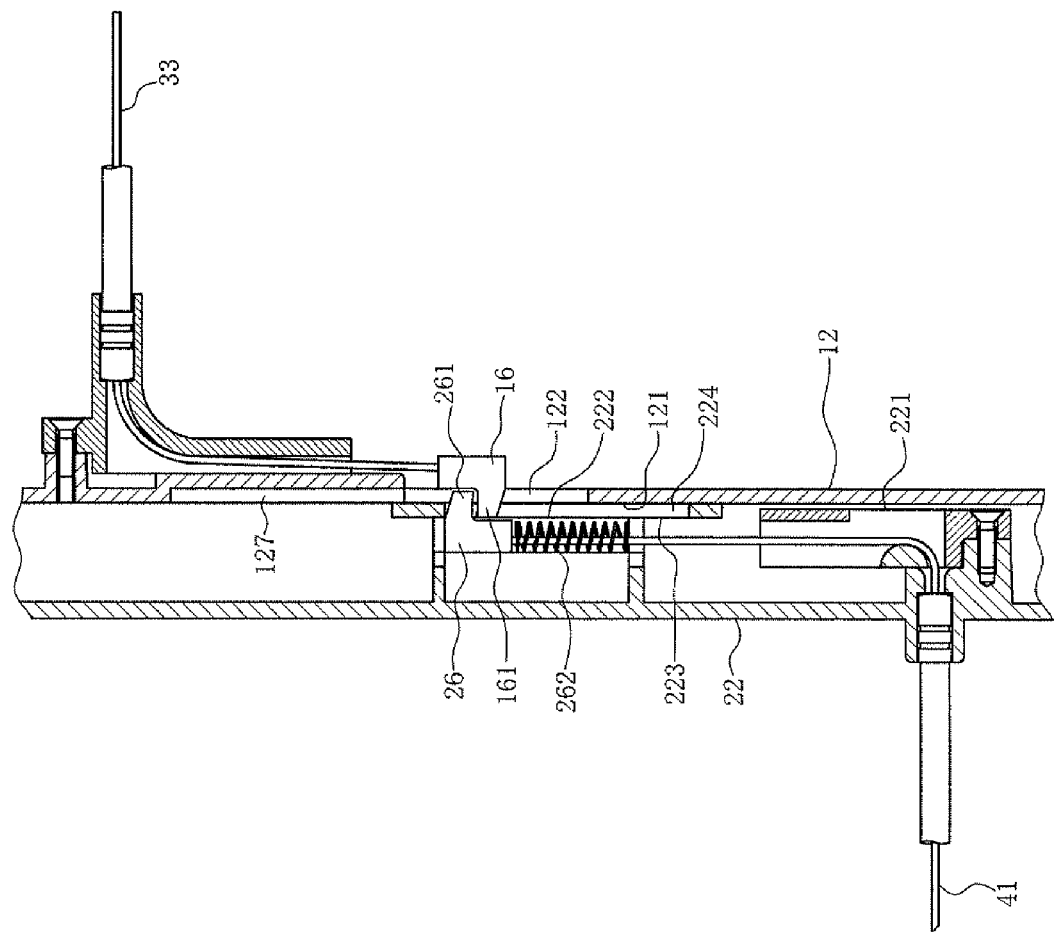
FIG. 16 is a partial cross-sectional view illustrating a means for connection and separation for a throttle wire in which the throttle lever is not pulled.

Lastly, the means for connection and separation for the throttle wire, the means for connection and separation for the lead wire, and the release button according to the present example will be described. Regardless of the pulling degree of the throttle lever, the means for connection and separation for the throttle wire of the present example allows the main unit side slider 26 to engage with the engine side slider 16 without fail so that the movement of the main unit side wire 41 pulled by the throttle lever can be transmitted to the engine side wire 33. As described above, at the stage the engine side annular surface 121 and the main unit side annular surface 221 are brought into contact with each other and the main unit side projections 23 are inserted between the engine side projections 13, the engine side slider 16 is positioned at the starting end of the engine side trajectory 122, the slider projection 161 is projected to the slider guiding path 224 continuing to the main unit side trajectory 222, and the slider projection 261 of the main unit side slider 26 is projected out to the slider guiding path 127 continuing to the engine side trajectory 122. At this stage, the main unit side slider 26 is on the upstream side of the rightward rotation (since FIG. 3 is viewed from back side, main unit side slider 26 appears to be rotating leftward) and the engine side slider 16 is on the downstream side of the rightward rotation. When the main unit side adapter 2 is rotated rightward with respect to the engine side adapter 1, the main unit side slider 26 approaches the engine side slider 16 from the upstream side, and the connection of the engine side adapter 1 and the main unit side adapter 2 is completed just before the respective slider projections 161, 261 are engaged, as illustrated in FIG. 16.

As illustrated in FIG. 17, when the throttle lever (not illustrated) is pulled, wherein the connection of the engine side adapter 1 and the main unit side adapter 2 are completed, the main unit side slider 26, to which the main unit side wire 41 is connected from the terminating end side of the main unit side trajectory 222, is pulled by the main unit side wire 41 and moving toward the downstream side of the rightward rotation, that is, toward the terminating end of the main unit side trajectory 222. The slider projection 261 of the main unit side slider 26 then engages the slider projection 161 of the engine side slider 16, thus moving the engine side slider 16 toward the downstream of the rightward rotation, that is, toward the terminating end of the engine side trajectory 122. The engine side wire 33 connected from the starting end side of the engine side trajectory 122 is pulled by the engine side slider 261, and the throttle of the engine 3 is opened. When the pulled throttle lever is returned, the throttle pulls the engine side wire 33 and returns the engine side slider 16 to the starting end side of the engine side trajectory 122. The main unit side slider 26 returns to the starting end side of the main unit side trajectory 222 by engaging the slider projection 261 to the slider projection 161 of the engine side slider 16 and being pulled, also by a repulsion of the slider return spring 262.

Although the position of the engine side slider 16 on the engine side annular surface 121 and the position of the main unit side slider 26 on the main unit side annular surface 221 are restricted by the relationship of the engine side wire 33 and the main unit side wire 41 respectively connected thereto, it is preferable that the distance on the same circumference be determined in the following manner. Namely, the movement amount of the main unit side slider 26, in which the engine side annular surface 121 and the main unit side annular surface 221 are brought into contact to each other without the throttle lever being pulled, the main unit side projection 23 is inserted between the engine side projections 13, and the main unit side adapter 2 is rotated rightward to complete the connection, is made longer than the movement amount of the main unit side slider 26 in which the throttle lever is maximally pulled. By adapting this configuration, the main unit side slider 26 approaches the engine side slider 16 until just before the respective slider projections 161, 261 engage when connecting the engine side adapter 1 and the main unit side adapter 2, if the throttle lever is not pulled. If the throttle lever is maximally pulled, the main unit side slider 26 pushes the engine side slider 16 to move toward the terminating end side of the engine side trajectory 122 while engaging the respective slider projections 161, 261 so that the throttle is in a maximally opened state. In the latter case, by returning the throttle lever, the engine side slider 16 and the main unit side slider 26 are returned to the starting end side of the engine side trajectory 122 and the main unit side trajectory 222, respectively. Therefore, the means for connection for the throttle wire of the present invention can engage the engine side slider 16 and the main unit side slider 26 regardless of the pulling degree of the throttle lever.

Figure 18:
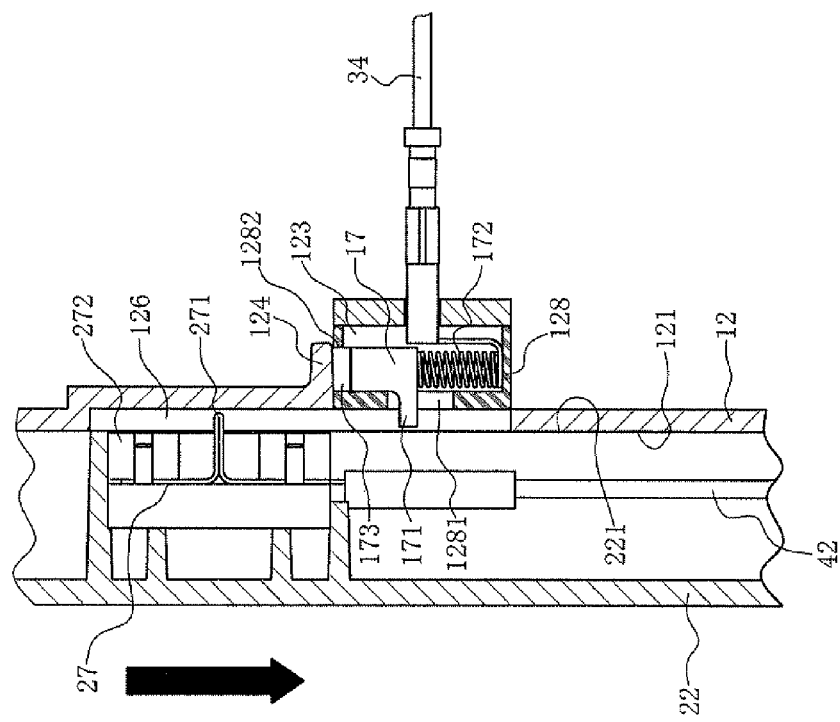
FIG. 18 is a partial cross-sectional view illustrating the means for connection and separation for the lead wire in which it begins to connect.
Figure 19:
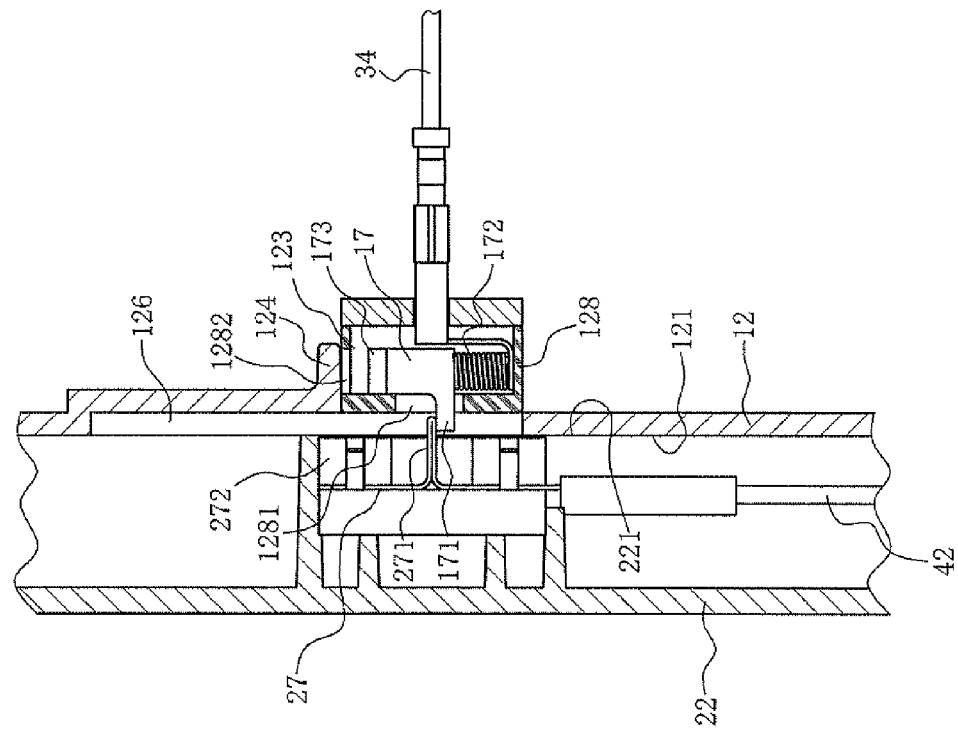
FIG. 19 is a partial cross-sectional view illustrating the means for connection and separation for the lead wire in which connection of it has completed.

The means for connection and separation for the lead wire in the structure for connection and separation of the present example prevents the engine from being carelessly started by grounding the stop circuit with respect to the engine 3 until the main unit side terminal 27 is brought into contact with the engine side terminal 17. Before the connection of the engine side adapter 1 and the main unit side adapter 2, as illustrated in FIG. 18, the engine side terminal 17 is pushed toward the starting end side of the terminal groove 123 arranged in the engine side annular surface 121 by the terminal return spring 172 so that the contact end 173 is brought into contact with the ground terminal 124 set on the starting end side of the terminal groove 123. The engine side terminal 17 is electrically connected with the engine side lead wire 34 extending from the stop circuit (not shown) through the terminal return spring 172, and causes the stop circuit to ground to the engine 3 by contacting with the ground terminal 124. Since the terminal projection 171 of the engine side terminal 17 does not project out from the engine side annular surface 121, the engine side terminal 17 is not carelessly pushed and moved. This means that the contact between the engine side terminal 17 and the ground terminal 124 is secured, and a fail safe is realized as a normal state in which the engine 3 is not carelessly started.

When the engine side annular surface 121 and the main unit side annular surface 221 are brought into contact and the main unit side projections 23 are inserted between the engine side projections 13, the engine side terminal 17 is positioned on the starting end side of the terminal groove 123, that is, the downstream side of the rightward rotation; and the main unit side terminal 27 is positioned on the upstream side of the rightward rotation with the terminal projection 271 projecting out to the terminal guiding path 126 continuing to the terminal groove 123. When the main unit side adapter 2 is rotated to the right with respect to the engine side adapter 1 from such a state, the terminal projection 271 of the main unit side terminal 27 engages to the terminal projection 171 of the engine side terminal 17 and starts to move the engine side terminal 17 toward the terminating end side of the terminal groove 123. The engine side terminal 17 thus separates the contact end 173 from the ground terminal 124, the engine side terminal 17 and the main unit side terminal 27 are conducted by the engagement of the respective projection terminals 171, 271, and the stop circuit is operated in accordance with ON/OFF of the stop switch (not shown).

Although the position of the engine side terminal 17 on the engine side annular surface 121 and the position of the main unit side terminal 27 on the main unit side annular surface 221 are restricted by the relationship of the engine side lead wire 34 and the main unit side lead wire 42 connected thereto, it is preferable that the distance on the same circumference be determined in the following manner. Namely, the distance between the engine side terminal 17 and the main unit side terminal 27 is made slightly shorter than the movement amount of the main unit side terminal 27 in which the engine side annular surface 121 and the main unit side annular surface 221 are brought into contact, the main unit side projections 23 are inserted between the engine side projections 13, and the main unit side adapter 2 is rotated to the right until the completion of connection. Thus, when connecting the engine side adapter 1 and the main unit side adapter 2, the main unit side terminal 27 and the engine side terminal 17 can be reliably engaged. In particular, when releasing the connection state of the engine side adapter 1 and the main unit side adapter 2, the engine side terminal 17, which disengages with the main unit side terminal 27, can be immediately brought into contact with the ground terminal 124 to be grounded. Thus, if the main unit side adapter 2 should detach from the engine side adapter 1 while using the mowing machine, the stop circuit is immediately actuated when the main unit side adapter 2 starts to detach so that the engine can be stopped (fail safe).

In the present example, the connection state of the engine side adapter 1 and the main unit side adapter 2 is maintained and released by the engagement of the stopper projection 291 of the release button 29 and the cutout 125. Also a rotation of the main unit side adapter 2 is restricted when they are connected. As illustrated in FIG. 20 to FIG. 22, the release button 29 is a block body having the stopper projection 291 projected out toward the engine side adapter 2 in the axial line direction of the power transmission shaft (rotation shaft 31 and output shaft 32), and can be pushed radially inward from the surface of the main unit side case 22. The pushed release button 29 is supported by the button return plate spring 292 attached to the inner periphery of the connection projection 25, and is pushed back radially outward by the elastically deforming button return plate spring 292 to return to the original state. The cutout 125 of the present example is formed on the inner periphery of the engine side annular surface 121, specifically, formed by depressing the inner periphery of the engine side projection 13 radially outward. A gradually changing inner periphery 131 is the portion from between the engine side projections 13 to the cutout 125.

The engagement and disengagement of the release button 29 and the cutout 125 are as follows. When the main unit side projections 23 of the main unit side adapter 2 are inserted from between the engine side projections 13 of the engine side adapter 1 to connect the engine side adapter 1 and the main unit side adapter 2, the stopper projection 291 is inserted to the inner side of the maximum radius portion of the gradually changing inner periphery 131 (see FIG. 20). When the main unit side adapter 2 is rotated to the right with respect to the engine side adapter 1 from this state about the axis of the power transmission shaft (rotation shaft 31 and output shaft 32), the stopper projection 291 rides on the gradually changing inner periphery, and is guided from the portion between the engine side projections 13 to the cutout 125 so that the release button 29 is gradually pushed inward in the radial direction (see FIG. 21). The release button 29 that is pushed inward in the radial direction is pushed radially outward by the elastically deformed button return plate spring 292, and hence the stopper projection 291 is pushed by the button return plate spring 292 when reaching the cutout 125 to be returned radially outward, thus engaging the stopper projection 291 to the cutout 125 (see FIG. 22).

In order to disengage the stopper projection 291 from the cutout 125, the release button 29 is pushed in to displace the stopper projection 291 to the inner side in the radial direction. Thus, the rotation of the main unit side adapter 2 with respect to the engine side adapter 1 is no longer restricted, and hence the connection state of the adapters is released by rotating the main unit side adapter 2 to the left, which is the opposite to the connection. The release button 29 may be pushed in only at the time of starting to rotate the main unit side adapter 2 to the left. Therefore, when connecting the engine side adapter 1 and the main unit side adapter 2, the rotation of the main unit side adapter 2 with respect to the engine side adapter 1 is regulated and the connection state of the engine side adapter 1 and the main unit side adapter 2 is maintained without particularly operating the release button 29. When separating the engine side adapter 1 and the main unit side adapter 2, the connection state of the engine side adapter 1 and the main unit side adapter 2 can be released by simply rotating the main unit side adapter 2 to the left with respect to the engine side adapter 1 with the release button 29 pushed in.

DESCRIPTION OF REFERENCE SIGNS 1 engine side adapter
11 clutch shoe
12 engine side case
121 engine side annular surface
122 engine side trajectory
123 terminal groove
124 ground terminal
125 cutout
13 engine side projection
131 gradually changing inner periphery
15 connection recess
16 engine side slider
161 slider projection
17 engine side terminal
171 terminal projection
2 main unit side adapter
21 clutch drum
22 main unit side case
221 main unit side annular surface
222 main unit side trajectory
223 trajectory block
23 main unit side projection
231 fixed plate
25 connection projection
26 main unit side slider
261 slider projection
27 main unit side terminal
271 terminal projection
272 terminal block
29 release button
291 stopper projection
3 engine
31 rotation shaft
32 output shaft
33 engine side wire
34 engine side lead wire
4 operation rod
41 main unit side wire
42 main unit side lead wire
43 protective tube

The invention claimed is:

1. A structure for connection and separation between an engine and an operation rod of a mowing machine, which is referred to as a main unit, adapted to release coupling by separating a clutch shoe and a clutch drum of a centrifugal clutch interposed in a power transmission shaft, the structure for connection and separation comprising:
an engine side adapter including the clutch shoe, an engine side annular surface and an engine side projection; and
a main unit side adapter including the clutch drum, a main unit side annular surface and a main unit side projection, wherein
in the engine side adaptor, the clutch shoe is connected to a rotation shaft which is an engine side of the power transmission shaft, the engine side annular surface and the engine side projection are provided on a radially outer side of the clutch drum of the main unit side adaptor to be connected,
in the main unit side adapter, the clutch drum is connected to an output shaft which is the main unit side of the power transmission shaft, the main unit side annular surface and the main unit side projection are provided on a radially outer side of the clutch drum,
the engine side projection projects in a radial direction from a circle centered on the power transmission shaft as a center, and the main unit side projection projects in a direction radially opposite to the direction in which the engine side projection projects,
the engine side adapter and the main unit side adapter have the engine side projection or the main unit side projection projecting radially outward from a fixing plate interposed between one of the engine side annular surface and the main unit side annular surface, and the clutch shoe or the clutch drum,
the engine side projection or the main unit side projection projecting radially inward from an inner periphery of the other one of the engine side annular surface and the main unit side annular surface,
the engine side adapter is provided with an engine side slider having a slider protection that moves forward and backward along an engine side trajectory extending in the circumferential direction about the axis of the power transmission shaft on the engine side annular surface, and an engine side wire extending from a throttle of the engine is connected to the engine side slider from a starting end side of the engine side trajectory,
the main unit side adapter is provided with a main unit side slider having a slider projection that moves forward and backward along a main unit side trajectory extending in the circumferential direction concentric with the engine side trajectory on the main unit side annular surface, and a main unit side wire extending from a throttle lever is connected from a terminating end side of the main unit side trajectory, when the engine side adapter or the main unit side adapter is relatively rotated about the axis of the power transmission shaft with the engine side annular surface and the main unit side annular surface brought into contact with each other and the engine side projection and the main unit side projection are engaged in the axial direction of the power transmission shaft, the main unit side slider is brought closer to the engine side slider from an upstream side of the rotation thus causing the main unit side slider at the starting end to engage or be proximate to the engine side slider, if the throttle lever is pulled, the main unit side wire pulls the main unit side slider connected thereto, the engine side slider, and the engine side wire through an engagement of the slider projection of the main unit side slider and the slider projection of the engine side slider to open the throttle, and if the throttle lever is loosened, the main unit side slider connecting the main unit side wire and the engine side slider connecting the engine side wire return to the starting end side of the engine side trajectory and a starting end side of the main unit side trajectory.

2. The structure for connection and separation between the engine and the main unit according to claim 1, wherein the engine side adapter and the main unit side adapter have a connection projection having a circular shape in front view, which projects out concentrically with the axis line of the power transmission shaft and in a direction orthogonal to a plane of the engine side annular surface or the main unit side annular surface and is arranged in one of the engine side annular surface and the main unit side annular surface, and a connection recess, which is concentric with the axis line of the power transmission shaft and to which the connection projection is fitted, is arranged on the other one of the engine side annular surface and the main unit side annular surface.

3. The structure for connection and separation between the engine and the main unit according to claim 1, wherein the engine side adapter and the main unit side adapter have a release button for displacing a stopper projection, which projects out in a direction orthogonal to a back end face or a front end face, radially inward by being pushed in a radial direction from an engine side case having the engine side annular surface as the front end face or a main unit side case having the main unit side annular surface as the back end face while being biased radially outward, and a cutout to which the stopper projection of the release button engages in the circumferential direction is arranged on the inner circumference of the engine side annular surface or the main unit side annular surface.

4. The structure for connection and separation between the engine and the main unit according to claim 1, wherein the engine side adapter is provided with an engine side terminal that moves forward and backward while being biased toward the starting end along a terminal groove extending in a circumferential direction about the axis of the power transmission shaft on the engine side annular surface, a ground terminal is arranged on the starting end side of the terminal groove, and an engine side lead wire extending from a stop circuit of the engine is connected to the engine side terminal;

the main unit side adapter is provided with a main unit side terminal on the main unit side annular surface on the circumference concentric with the terminal groove, and a main unit side lead wire extending from a stop switch is connected to the main unit side terminal;

the engine side terminal is brought into contact with the ground terminal at the starting end side to operate the stop circuit in the normal state; and when the engine side adapter or the main unit side adapter is relatively rotated about the axis of the power transmission shaft with the engine side annular surface and the main unit side annular surface brought into contact with each other and the engine side projection and the main unit side projection are engaged in the axial direction of the power transmission shaft, the contact of the engine side terminal and the ground terminal is released and the engine side terminal and the main unit side terminal are conducted by moving the engine side terminal engaged to the main unit side terminal from the starting end side, and the stop circuit is operated in accordance with ON/OFF of the stop switch.

\* \* \* \* \*